United States Patent
Hoellwarth

(10) Patent No.: US 8,799,815 B2
(45) Date of Patent: Aug. 5, 2014

(54) DEVICE, METHOD, AND GRAPHICAL USER INTERFACE FOR ACTIVATING AN ITEM IN A FOLDER

(75) Inventor: Quin C. Hoellwarth, Kuna, ID (US)

(73) Assignee: Apple Inc., Cupertino, CA (US)

( * ) Notice: Subject to any disclaimer, the term of this patent is extended or adjusted under 35 U.S.C. 154(b) by 388 days.

(21) Appl. No.: 12/848,062

(22) Filed: Jul. 30, 2010

(65) Prior Publication Data

US 2012/0030623 A1 Feb. 2, 2012

(51) Int. Cl.
G06F 3/048 (2013.01)
G06F 3/0482 (2013.01)
G06F 3/0488 (2013.01)

(52) U.S. Cl.
CPC .......... *G06F 3/0482* (2013.01); *G06F 3/0488* (2013.01)
USPC ....................................... 715/811

(58) Field of Classification Search
None
See application file for complete search history.

(56) References Cited

U.S. PATENT DOCUMENTS

| | | | |
|---|---|---|---|
| 5,572,238 A | 11/1996 | Krivacic | |
| 5,736,974 A | 4/1998 | Selker | |
| 5,745,116 A | 4/1998 | Pisutha-Arnond | |
| 5,745,718 A * | 4/1998 | Cline et al. | 715/777 |
| 5,760,774 A * | 6/1998 | Grossman et al. | 715/835 |
| 5,801,699 A | 9/1998 | Hocker et al. | |
| 6,160,551 A * | 12/2000 | Naughton et al. | 715/769 |
| 6,545,669 B1 * | 4/2003 | Kinawi et al. | 345/173 |
| 6,597,345 B2 | 7/2003 | Hirshberg | |
| 6,753,888 B2 * | 6/2004 | Kamiwada et al. | 715/782 |
| 6,874,128 B1 | 3/2005 | Moore et al. | |
| 7,010,755 B2 | 3/2006 | Anderson et al. | |
| 7,080,326 B2 | 7/2006 | Molander et al. | |
| 7,088,340 B2 * | 8/2006 | Kato | 345/168 |
| 7,155,667 B1 | 12/2006 | Kotler et al. | |
| 7,173,603 B2 | 2/2007 | Kawasome | |
| 7,194,698 B2 | 3/2007 | Gottfurcht et al. | |
| 7,237,240 B1 * | 6/2007 | Chen et al. | 718/100 |
| 7,287,232 B2 | 10/2007 | Tsuchimura et al. | |
| 7,403,211 B2 | 7/2008 | Sheasby et al. | |

(Continued)

FOREIGN PATENT DOCUMENTS

| | | | |
|---|---|---|---|
| EP | 1 003 098 A2 | 5/2000 | |
| EP | 1 186 997 A2 | 3/2002 | |

(Continued)

OTHER PUBLICATIONS

Microsoft Manual (XP Inside Out, Second Edition, 2007).*

(Continued)

*Primary Examiner* — Ryan Pitaro
*Assistant Examiner* — Ryan Barrett
(74) *Attorney, Agent, or Firm* — Morrison & Foerster LLP

(57) ABSTRACT

A portable electronic device displays a plurality of icons on a touch-sensitive display. The plurality of icons includes a folder icon that corresponds to a folder that contains a plurality of items. The folder icon includes respective selectable item indicators for at least some of the items in the folder. The device detects a finger gesture on the touch-sensitive display at a location that corresponds to the folder icon. In response to detecting the finger gesture on the touch-sensitive display at the location that corresponds to the folder icon, the device determines a respective item in the plurality of items in the folder that corresponds to the detected finger gesture and activates the respective item.

21 Claims, 26 Drawing Sheets

(56) References Cited

U.S. PATENT DOCUMENTS

| | | | |
|---|---|---|---|
| 7,415,677 B2 | 8/2008 | Arend et al. | |
| 7,444,390 B2 | 10/2008 | Tadayon et al. | |
| 7,478,437 B2 | 1/2009 | Hatanaka et al. | |
| 7,480,872 B1 | 1/2009 | Ubillos | |
| 7,584,278 B2 | 9/2009 | Rajarajan et al. | |
| 7,594,185 B2 | 9/2009 | Anderson et al. | |
| 7,596,766 B1 | 9/2009 | Sharma et al. | |
| 7,636,898 B2 | 12/2009 | Takahashi | |
| 7,791,755 B2 | 9/2010 | Mori | |
| 7,840,907 B2 | 11/2010 | Kikuchi et al. | |
| 7,843,454 B1* | 11/2010 | Biswas | 345/473 |
| 7,904,832 B2 | 3/2011 | Ubillos | |
| 7,908,569 B2* | 3/2011 | Ala-Rantala | 715/853 |
| 8,065,618 B2 | 11/2011 | Kumar et al. | |
| 8,152,640 B2 | 4/2012 | Shirakawa et al. | |
| 8,156,175 B2 | 4/2012 | Hopkins | |
| 8,161,419 B2 | 4/2012 | Palahnuk et al. | |
| 8,255,808 B2 | 8/2012 | Lindgren et al. | |
| 2001/0038394 A1 | 11/2001 | Tsuchimura et al. | |
| 2002/0057287 A1 | 5/2002 | Crow et al. | |
| 2002/0078037 A1 | 6/2002 | Hatanaka et al. | |
| 2002/0097261 A1 | 7/2002 | Gottfurcht et al. | |
| 2002/0143949 A1 | 10/2002 | Rajarajan et al. | |
| 2002/0167683 A1 | 11/2002 | Hanamoto et al. | |
| 2003/0080991 A1 | 5/2003 | Crow et al. | |
| 2003/0160825 A1 | 8/2003 | Weber | |
| 2003/0169288 A1 | 9/2003 | Misawa | |
| 2003/0189597 A1 | 10/2003 | Anderson et al. | |
| 2004/0008224 A1 | 1/2004 | Molander et al. | |
| 2004/0119757 A1* | 6/2004 | Corley et al. | 345/837 |
| 2004/0160462 A1 | 8/2004 | Sheasby et al. | |
| 2005/0012862 A1 | 1/2005 | Lee | |
| 2005/0043987 A1 | 2/2005 | Kumar et al. | |
| 2005/0177796 A1 | 8/2005 | Takahashi | |
| 2006/0004685 A1 | 1/2006 | Pyhalammi et al. | |
| 2006/0020903 A1 | 1/2006 | Wang et al. | |
| 2006/0026535 A1 | 2/2006 | Hotelling et al. | |
| 2006/0080617 A1 | 4/2006 | Anderson et al. | |
| 2006/0112347 A1 | 5/2006 | Baudisch | |
| 2006/0117372 A1 | 6/2006 | Hopkins | |
| 2006/0284852 A1 | 12/2006 | Hofmeister et al. | |
| 2007/0032267 A1 | 2/2007 | Haitani et al. | |
| 2007/0050726 A1 | 3/2007 | Wakai et al. | |
| 2007/0055940 A1* | 3/2007 | Moore et al. | 715/738 |
| 2007/0061745 A1* | 3/2007 | Anthony et al. | 715/764 |
| 2007/0065044 A1* | 3/2007 | Park et al. | 382/305 |
| 2007/0136351 A1 | 6/2007 | Dames et al. | |
| 2007/0150834 A1 | 6/2007 | Muller et al. | |
| 2007/0157089 A1 | 7/2007 | van Os et al. | |
| 2007/0174785 A1 | 7/2007 | Perttula | |
| 2007/0179938 A1 | 8/2007 | Ikeda et al. | |
| 2007/0209004 A1 | 9/2007 | Layard | |
| 2008/0014917 A1 | 1/2008 | Rhoads et al. | |
| 2008/0040668 A1 | 2/2008 | Ala-Rantala | |
| 2008/0094369 A1 | 4/2008 | Ganatra et al. | |
| 2008/0117461 A1 | 5/2008 | Mitsutake et al. | |
| 2008/0136785 A1 | 6/2008 | Baudisch et al. | |
| 2008/0148182 A1 | 6/2008 | Chiang et al. | |
| 2008/0184112 A1 | 7/2008 | Chiang et al. | |
| 2008/0215980 A1 | 9/2008 | Lee et al. | |
| 2008/0229254 A1 | 9/2008 | Warner | |
| 2008/0244119 A1 | 10/2008 | Tokuhara et al. | |
| 2008/0307350 A1 | 12/2008 | Sabatelli et al. | |
| 2009/0007017 A1 | 1/2009 | Anzures et al. | |
| 2009/0009815 A1 | 1/2009 | Karasik et al. | |
| 2009/0055748 A1 | 2/2009 | Dieberger et al. | |
| 2009/0113350 A1* | 4/2009 | Hibino et al. | 715/853 |
| 2009/0122018 A1 | 5/2009 | Vymenets et al. | |
| 2009/0132965 A1 | 5/2009 | Shimizu | |
| 2009/0144653 A1 | 6/2009 | Ubillos | |
| 2009/0158200 A1 | 6/2009 | Palahnuk et al. | |
| 2009/0172606 A1 | 7/2009 | Dunn et al. | |
| 2009/0178008 A1 | 7/2009 | Herz et al. | |
| 2009/0222766 A1 | 9/2009 | Chae et al. | |
| 2009/0228807 A1* | 9/2009 | Lemay | 715/752 |
| 2009/0228825 A1 | 9/2009 | van Os et al. | |
| 2009/0278806 A1 | 11/2009 | Duarte et al. | |
| 2010/0058182 A1 | 3/2010 | Jung | |
| 2010/0077333 A1 | 3/2010 | Yang et al. | |
| 2010/0146451 A1* | 6/2010 | Jun-Dong et al. | 715/841 |
| 2010/0153878 A1 | 6/2010 | Lindgren et al. | |
| 2010/0162108 A1* | 6/2010 | Stallings et al. | 716/702 |
| 2010/0191701 A1 | 7/2010 | Beyda et al. | |
| 2010/0211919 A1* | 8/2010 | Brown et al. | 715/863 |
| 2010/0214216 A1* | 8/2010 | Nasiri et al. | 345/158 |
| 2010/0223563 A1 | 9/2010 | Green | |
| 2010/0248788 A1 | 9/2010 | Yook et al. | |
| 2010/0262591 A1* | 10/2010 | Lee et al. | 707/706 |
| 2010/0262634 A1 | 10/2010 | Wang | |
| 2010/0287505 A1* | 11/2010 | Williams | 715/823 |
| 2011/0010672 A1* | 1/2011 | Hope | 715/841 |
| 2011/0029934 A1 | 2/2011 | Locker et al. | |
| 2011/0087981 A1* | 4/2011 | Jeong et al. | 715/765 |
| 2011/0099299 A1 | 4/2011 | Vasudevan et al. | |
| 2011/0107261 A1* | 5/2011 | Lin et al. | 715/811 |
| 2011/0119610 A1 | 5/2011 | Hackborn et al. | |
| 2011/0148786 A1 | 6/2011 | Day et al. | |
| 2011/0179097 A1 | 7/2011 | Ala-Rantala | |
| 2011/0179368 A1* | 7/2011 | King et al. | 715/769 |
| 2011/0239155 A1* | 9/2011 | Christie | 715/784 |
| 2011/0246918 A1* | 10/2011 | Henderson | 715/769 |
| 2011/0246929 A1 | 10/2011 | Jones et al. | |
| 2011/0252372 A1 | 10/2011 | Chaudhri | |
| 2011/0289423 A1* | 11/2011 | Kim et al. | 715/741 |
| 2011/0289448 A1 | 11/2011 | Tanaka | |
| 2011/0310058 A1 | 12/2011 | Yamada et al. | |
| 2012/0030623 A1* | 2/2012 | Hoellwarth | 715/811 |
| 2012/0036460 A1 | 2/2012 | Cieplinski et al. | |
| 2012/0042272 A1 | 2/2012 | Hong et al. | |
| 2012/0117506 A1 | 5/2012 | Koch et al. | |
| 2012/0124677 A1* | 5/2012 | Hoogerwerf et al. | 726/29 |

FOREIGN PATENT DOCUMENTS

| | | |
|---|---|---|
| EP | 1 271 295 A2 | 1/2003 |
| EP | 1 956 472 A1 | 8/2009 |
| WO | WO 98/44431 A2 | 10/1998 |
| WO | WO 2008/017936 A2 | 2/2008 |

OTHER PUBLICATIONS

Invitation to Pay Additional Fees dated Jan. 5, 2011, received in International Application No. PCT/US2010/050056, which corresponds to U.S. Appl. No. 12/888,362 (Chaudhri).

International Search Report and Written Opinion dated May 13, 2011, received in International Patent Application No. PCT/US2010/050056, which corresponds to U.S. Appl. No. 12/888,362 (Chaudhri).

Bott et al., "Table of Contents/Chapter 20: Putting Pictures on Folder Icons;" Microsoft Windows XP Inside Out Deluxe, Second Edition, Oct. 2004, pp. 1-8 and 669, http://proquest.safaribooksonline.com/book/operating-systems/9780735642171.

Collomb, "Improving drag-and-drop on wall-size displays," 2005 proceedings of Graphics Interface, pp. 25-32.

Microsoft Help and Support, "How to Arrange or Move Icons on the Desktop," 2 pages, http://support.microsoft.com/kb/289587.

Microsoft Windows (Copyright 2009), 2 pages.

Nishida et al., "Drag-and-Guess: Drag-and-Drop with Prediction," Interact '07 Proceedings of the 11th IFIP TC 13 International Conference on Human-Computer Interaction, Sep. 2007, pp. 461-474.

Ren et al., "The Adaptive Hybrid Cursor: A Pressure-Based Target Selection Technique for Pen-Based User Interfaces," Interact '07 Proceedings of the 11th IFIP TC 13 International Conference on Human-Computer Interaction, Sep. 2007, pp. 310-323.

Windows XP, "Enable or disable AutoArrange desktop icons in Windows XP," Windows Tutorials, Nov. 19, 2009, http://www.freemailtutorials.com/microsoftWindows/autoArrangeIconsOnTheDesktop.php, 3 pages.

International Preliminary Report on Patentability dated Oct. 18, 2012, received in International Patent Application No. PCT/US2010/050056, which corresponds to U.S. Appl. No. 12/888,362, 21 pages (Chaudhri).

(56) References Cited

OTHER PUBLICATIONS

Office Action dated Jul. 20, 2012, received in U.S. Appl. No. 12/888,362, 17 pages, (Chandhri).
Office Action dated Jul. 31, 2012, received in Chinese Patent Application No. 201010592864.9, which corresponds to U.S. Appl. No. 12/888,362, 6 pages (Chaudhri).
Office Action dated Jul. 9, 2012, received in U.S. Appl. No. 12/849,767, 17 pages (Cieplinski).
Office Action dated Jul. 31, 2012, received in U.S. Appl. No. 12/888,306, 11 pages (Chaudhri).
Office Action dated Aug. 22, 2012, received in U.S. Appl. No. 12/888,370, 14 pages (Chaudhri).
Office Action dated Sep. 10, 2012, received in U.S. Appl. No. 12/888,313, 14 pages (Chaudhri).
Office Action dated Jun. 7, 2012, received in U.S. Appl. No. 12/888,375, 12 pages (Chaudhri).
Final Office Action dated Nov. 7, 2012, received in U.S. Appl. No. 12/888,375, 14 pages (Chaudhri).
Office Action dated Oct. 2, 2012, received in U.S. Appl. No. 12/888,376, 13 pages (Chaudhri).
Office Action dated Sep. 13, 2012, received in U.S. Appl. No. 12/888,377, 14 pages (Chaudhri).
Leeon, N., LG Tritan (U.S. Cellular), CNET editors' review, updated Sep. 25, 2009, 4 pages.
Final Office Action dated Jan. 3, 2013, received in U.S. Appl. No. 12/888,362, 16 pages (Chaudhri).
Notice of Allowance dated Jan. 8, 2013, received in U.S. Appl. No. 12/849,767, 11 pages (Cleplinski).
Notice of Allowance dated Dec. 14, 2012, received in U.S. Appl. No. 12/888,366, 14 pages (Chaudhri).
Notice of Allowance dated Feb. 12, 2013, received in U.S. Appl. No. 12/888,370, 13 pages (Chaudhri).
Notice of Allowance dated Feb. 22, 2013, received in U.S. Appl. No. 12/888,373, 15 pages (Chaudhri).
Final Office Action dated Feb. 8, 2013, received in U.S. Appl. No. 12/888,376, 14 pages (Chaudhri).
Notice of Allowance dated Jan. 30, 2013 received in U.S. Appl. No. 12/888,377 15 pages (Chaudhri).

\* cited by examiner

DEVICE, METHOD, AND GRAPHICAL USER INTERFACE FOR ACTIVATING AN ITEM IN A FOLDER

TECHNICAL FIELD

This relates generally to electronic devices with touch-sensitive surfaces, including but not limited to electronic devices with folders that contain items such as applications, digital content, electronic documents, and/or sub-folders.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include activating one or more user interface objects. Exemplary user interface objects include digital images, video, text, icons (including folder icons), and other graphics. A user may need to perform such manipulations on user interface objects on a home screen, in a file management program (e.g., Finder from Apple Inc. of Cupertino, Calif.), an image management application (e.g., Aperture or iPhoto from Apple Inc. of Cupertino, Calif.), or a digital content (e.g., videos and music) management application (e.g., iTunes from Apple Inc. of Cupertino, Calif.). Some user interface objects may correspond to items stored in folders.

But existing methods for activating an item in a folder are cumbersome and inefficient. For example, using a sequence of inputs to open a folder and then activate one or more items in the folder takes longer than necessary, thereby wasting energy. This consideration is particularly important in battery-operated devices.

SUMMARY

Accordingly, there is a need for computing devices with faster, more efficient methods and interfaces for activating an item in a folder. Such methods and interfaces may complement or replace conventional methods for activating a user interface object in a folder. Such methods and interfaces produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a portable electronic device with a touch-sensitive display. The method includes displaying a plurality of icons on the touch-sensitive display. The plurality of icons includes a folder icon that corresponds to a folder that contains a plurality of items. The folder icon includes respective selectable item indicators for at least some of the items in the folder. The method also includes detecting a finger gesture on the touch-sensitive display at a location that corresponds to the folder icon. The method furthermore includes, in response to detecting the finger gesture on the touch-sensitive display at the location that corresponds to the folder icon: determining a respective item in the plurality of items in the folder that corresponds to the detected finger gesture and activating the respective item.

In accordance with some embodiments, a portable electronic device includes a touch-sensitive display, one or more processors, memory, and one or more programs. The one or more programs are stored in the memory and configured to be executed by the one or more processors. The one or more programs include instructions for displaying a plurality of icons on the touch-sensitive display. The plurality of icons includes a folder icon that corresponds to a folder that contains a plurality of items. The folder icon includes respective selectable item indicators for at least some of the items in the folder. The one or more programs also include instructions for detecting a finger gesture on the touch-sensitive display at a location that corresponds to the folder icon. The one or more programs furthermore include instructions for, in response to detecting the finger gesture on the touch-sensitive display at the location that corresponds to the folder icon: determining a respective item in the plurality of items in the folder that corresponds to the detected finger gesture and activating the respective item.

In accordance with some embodiments, a computer readable storage medium has stored therein instructions, which when executed by a portable electronic device with a touch-sensitive display, cause the device to display a plurality of icons on the touch-sensitive display. The plurality of icons includes a folder icon that corresponds to a folder that contains a plurality of items. The folder icon includes respective selectable item indicators for at least some of the items in the folder. The instructions also cause the device to detect a finger gesture on the touch-sensitive display at a location that corresponds to the folder icon. The instructions furthermore cause the device to, in response to detecting the finger gesture on the touch-sensitive display at the location that corresponds to the folder icon: determine a respective item in the plurality of items in the folder that corresponds to the detected finger gesture and activate the respective item.

In accordance with some embodiments, a graphical user interface on a portable electronic device with a touch-sensitive display, a memory, and one or more processors to execute one or more programs stored in the memory includes a plurality of icons on the touch-sensitive display. The plurality of icons includes a folder icon that corresponds to a folder that contains a plurality of items. The folder icon includes respective selectable item indicators for at least some of the items in the folder. A finger gesture on the touch-sensitive display is detected at a location that corresponds to the folder icon. In response to detecting the finger gesture on the touch-sensitive display at the location that corresponds to the folder icon: a respective item in the plurality of items in the folder that corresponds to the detected finger gesture is determined and the respective item is activated.

In accordance with some embodiments, a portable electronic device includes: a touch-sensitive display; and means for displaying a plurality of icons on the touch-sensitive display. The plurality of icons includes a folder icon that corresponds to a folder that contains a plurality of items. The folder icon includes respective selectable item indicators for at least some of the items in the folder. The portable electronic device also includes means for detecting a finger gesture on the touch-sensitive display at a location that corresponds to the folder icon. The portable electronic device furthermore includes, in response to detecting the finger gesture on the touch-sensitive display at the location that corresponds to the folder icon: means for determining a respective item in the plurality of items in the folder that corresponds to the detected finger gesture and means for activating the respective item.

In accordance with some embodiments, an information processing apparatus for use in a portable electronic device with a touch-sensitive display includes means for displaying a plurality of icons on the touch-sensitive display. The plurality of icons includes a folder icon that corresponds to a folder that contains a plurality of items. The folder icon includes respective selectable item indicators for at least some of the items in the folder. The information processing apparatus also includes means for detecting a finger gesture on the touch-sensitive display at a location that corresponds to the folder icon. The information processing apparatus furthermore includes, in response to detecting the finger gesture on the touch-sensitive display at the location that corresponds to the folder icon: means for determining a respective item in the plurality of items in the folder that corresponds to the detected finger gesture and means for activating the respective item.

In accordance with some embodiments, a method is performed at a portable electronic device with a touch-sensitive display. The method includes displaying a contact icon in a predefined area in a home menu screen on the touch-sensitive display. The contact icon corresponds to a contact. The contact icon is configured to display a missed call indicia in response to detecting a missed call from the contact. The contact icon is configured to display an instant message indicia in response to receiving an instant message from the contact. The method also includes detecting a finger gesture on the contact icon. The method furthermore includes, in response to detecting the finger gesture on the contact icon: calling the contact when the missed call indicia is displayed without concurrent display of the instant message indicia and displaying the instant message from the contact when the instant message indicia is displayed without concurrent display of the missed call indicia.

In accordance with some embodiments, a portable electronic device includes a touch-sensitive display, one or more processors, memory, and one or more programs. The one or more programs are stored in the memory and configured to be executed by the one or more processors. The one or more programs include instructions for displaying a contact icon in a predefined area in a home menu screen on the touch-sensitive display. The contact icon corresponds to a contact. The contact icon is configured to display a missed call indicia in response to detecting a missed call from the contact. The contact icon is configured to display an instant message indicia in response to receiving an instant message from the contact. The one or more programs also include instructions for detecting a finger gesture on the contact icon. The one or more programs furthermore include instructions for, in response to detecting the finger gesture on the contact icon: calling the contact when the missed call indicia is displayed without concurrent display of the instant message indicia and displaying the instant message from the contact when the instant message indicia is displayed without concurrent display of the missed call indicia.

In accordance with some embodiments, a computer readable storage medium has stored therein instructions, which when executed by a portable electronic device with a touch-sensitive display, cause the device to display a contact icon in a predefined area in a home menu screen on the touch-sensitive display. The contact icon corresponds to a contact. The contact icon is configured to display a missed call indicia in response to detecting a missed call from the contact. The contact icon is configured to display an instant message indicia in response to receiving an instant message from the contact. The instructions also cause the device to detect a finger gesture on the contact icon. The instructions furthermore cause the device to, in response to detecting the finger gesture on the contact icon: call the contact when the missed call indicia is displayed without concurrent display of the instant message indicia and display the instant message from the contact when the instant message indicia is displayed without concurrent display of the missed call indicia.

In accordance with some embodiments, a graphical user interface on a portable electronic device with a touch-sensitive display, a memory, and one or more processors to execute one or more programs stored in the memory includes a contact icon in a predefined area in a home menu screen on the touch-sensitive display. The contact icon corresponds to a contact. The contact icon is configured to display a missed call indicia in response to detecting a missed call from the contact. The contact icon is configured to display an instant message indicia in response to receiving an instant message from the contact. A finger gesture on the contact icon is detected. In response to detecting the finger gesture on the contact icon: the contact is called when the missed call indicia is displayed without concurrent display of the instant message indicia and the instant message from the contact is displayed when the instant message indicia is displayed without concurrent display of the missed call indicia.

In accordance with some embodiments, a portable electronic device includes: a touch-sensitive display; and means for displaying a contact icon in a predefined area in a home menu screen on the touch-sensitive display. The contact icon corresponds to a contact. The contact icon is configured to display a missed call indicia in response to detecting a missed call from the contact. The contact icon is configured to display an instant message indicia in response to receiving an instant message from the contact. The portable electronic device also includes means for detecting a finger gesture on the contact icon. The portable electronic device furthermore includes, in response to detecting the finger gesture on the contact icon: means for calling the contact when the missed call indicia is displayed without concurrent display of the instant message indicia and means for displaying the instant message from the contact when the instant message indicia is displayed without concurrent display of the missed call indicia.

In accordance with some embodiments, an information processing apparatus for use in a portable electronic device with a touch-sensitive display includes means for displaying a contact icon in a predefined area in a home menu screen on the touch-sensitive display. The contact icon corresponds to a contact. The contact icon is configured to display a missed call indicia in response to detecting a missed call from the contact. The contact icon is configured to display an instant message indicia in response to receiving an instant message from the contact. The information processing apparatus also includes means for detecting a finger gesture on the contact icon. The information processing apparatus furthermore includes, in response to detecting the finger gesture on the contact icon: means for calling the contact when the missed call indicia is displayed without concurrent display of the instant message indicia and means for displaying the instant message from the contact when the instant message indicia is displayed without concurrent display of the missed call indicia.

Thus, portable electronic devices with touch-sensitive displays are provided with faster, more efficient methods and interfaces for activating an item in a folder, thereby increasing the effectiveness, efficiency, and user satisfaction with such devices. Such methods and interfaces may complement conventional methods for activating items in folders (e.g., activating a folder icon to display the folder and icons for items in the folder, and then activating an icon for an item in the folder to activate and display the corresponding item).

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
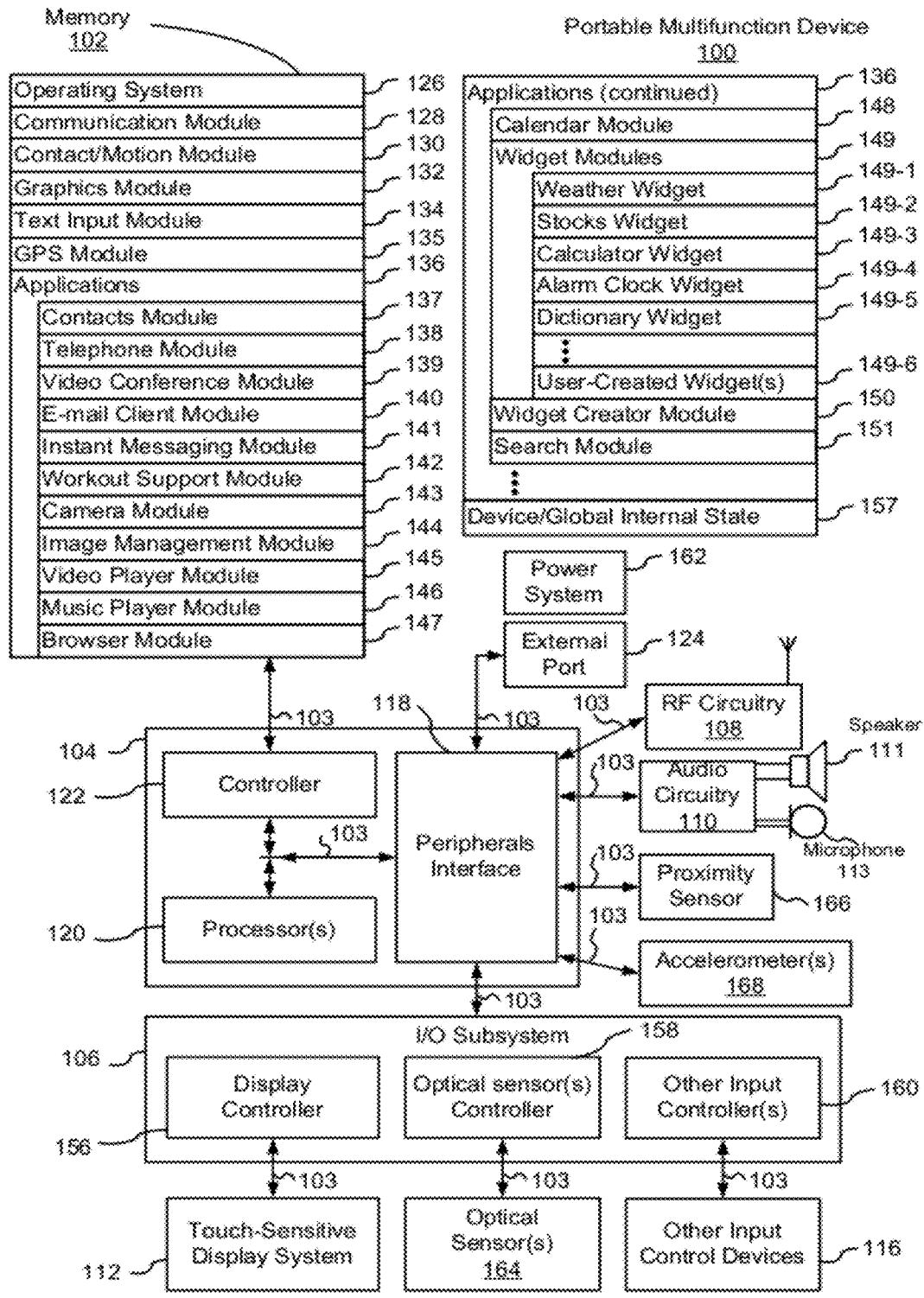
FIGS. 1A and 1B are block diagrams illustrating portable multifunction devices with touch-sensitive displays in accordance with some embodiments.

Many electronic devices have graphical user interfaces with folders that contain items such as applications, digital content, electronic documents, and/or sub-folders. Because a user typically stores related items together in a folder, folders are useful tools for organizing items stored in electronic devices. A user often wants to activate an item in a folder. Existing methods for activating an item in a folder typically require a sequence of user inputs that opens the folder and then activates the item within the folder. For example, with existing methods, a user typically needs to select and activate a folder icon to display items within a corresponding folder. After displaying the items within the folder, the user needs to select and activate the item. In the embodiments described below, an improved method for activating an item in a folder is achieved by displaying a folder icon that includes respective selectable item indicators for at least some of the items in the folder. Detection of a finger gesture on the folder icon activates an item that corresponds to the finger gesture, without opening the folder. This method streamlines the item activation process by activating an item in a folder with a single gesture on the folder icon, thereby eliminating the need for extra, separate steps to open the folder.

Below, FIGS. 1A-1C, 2, and 3 provide a description of exemplary devices. FIGS. 4A-4C and 5A-5J illustrate exemplary user interfaces for activating an item in a folder. FIGS. 6A-6B are flow diagrams illustrating a method of activating an item in a folder. The user interfaces in FIGS. 5A-5J are used to illustrate the processes in FIGS. 6A-6B.

FIGS. 7A-7D illustrate exemplary user interfaces for displaying a contact icon and responding to activation of the contact icon. FIGS. 8A-8B are flow diagrams illustrating a method of displaying a contact icon and responding to activation of the contact icon. The user interfaces in FIGS. 7A-7D are used to illustrate the processes in FIGS. 8A-8B.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
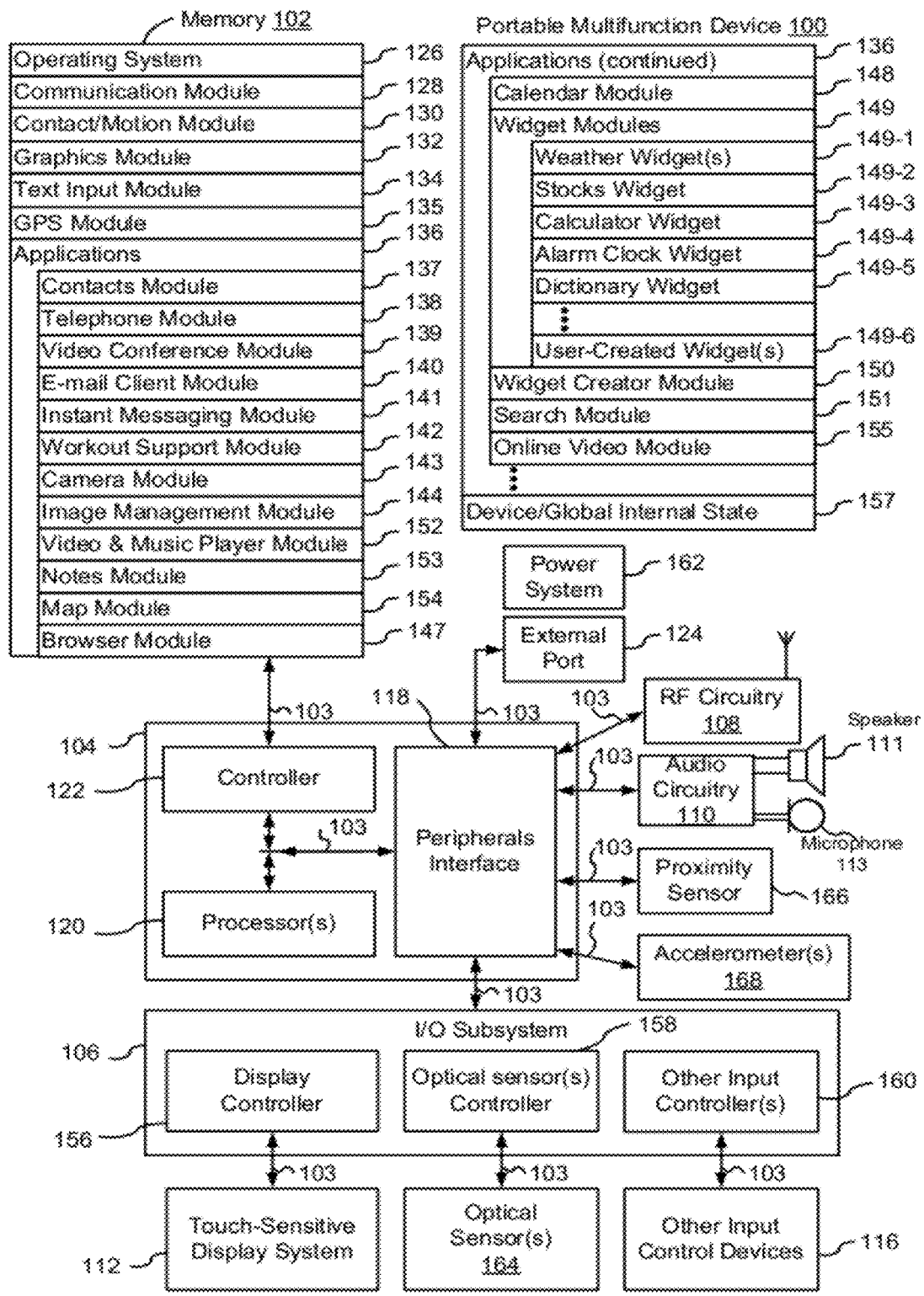

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
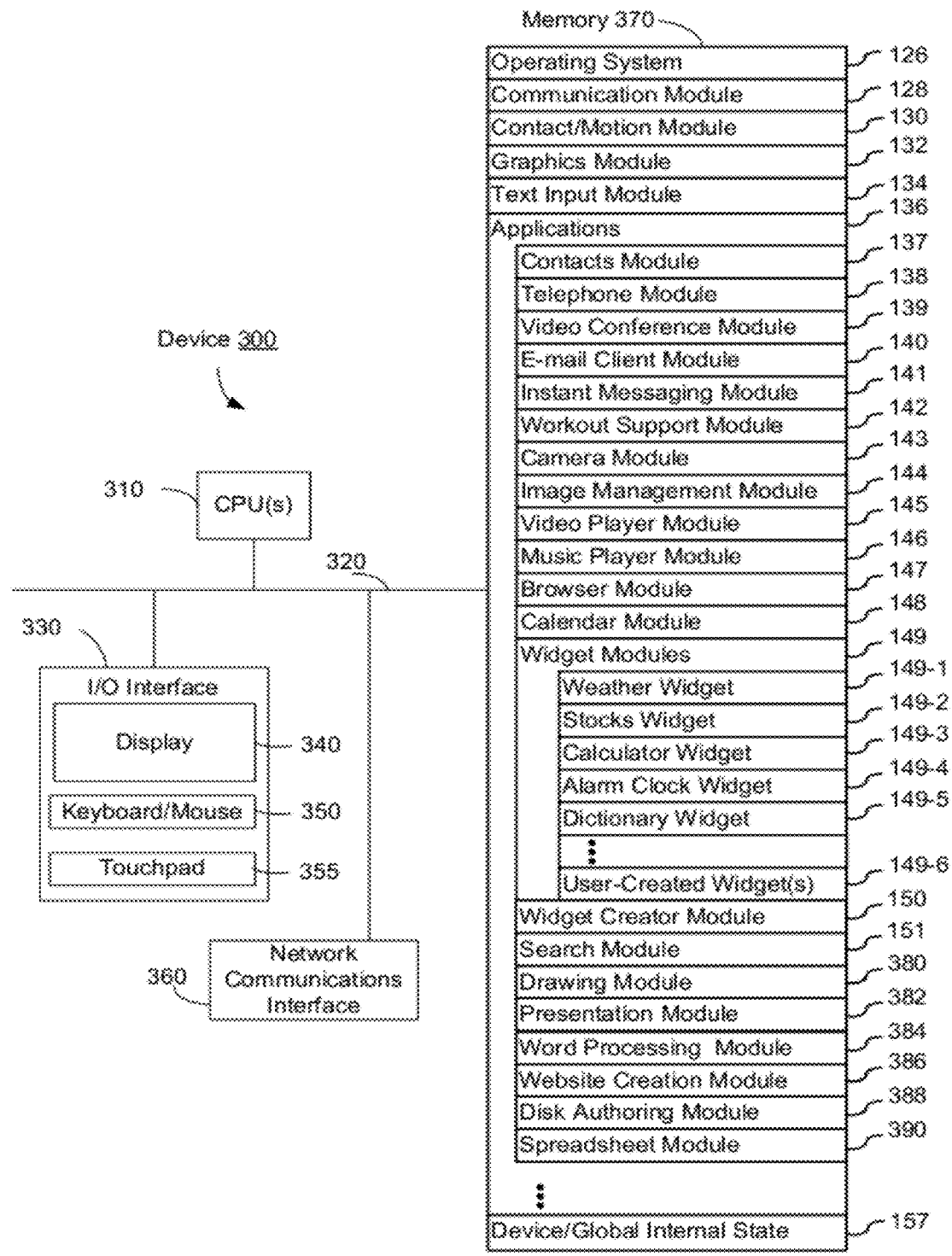
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
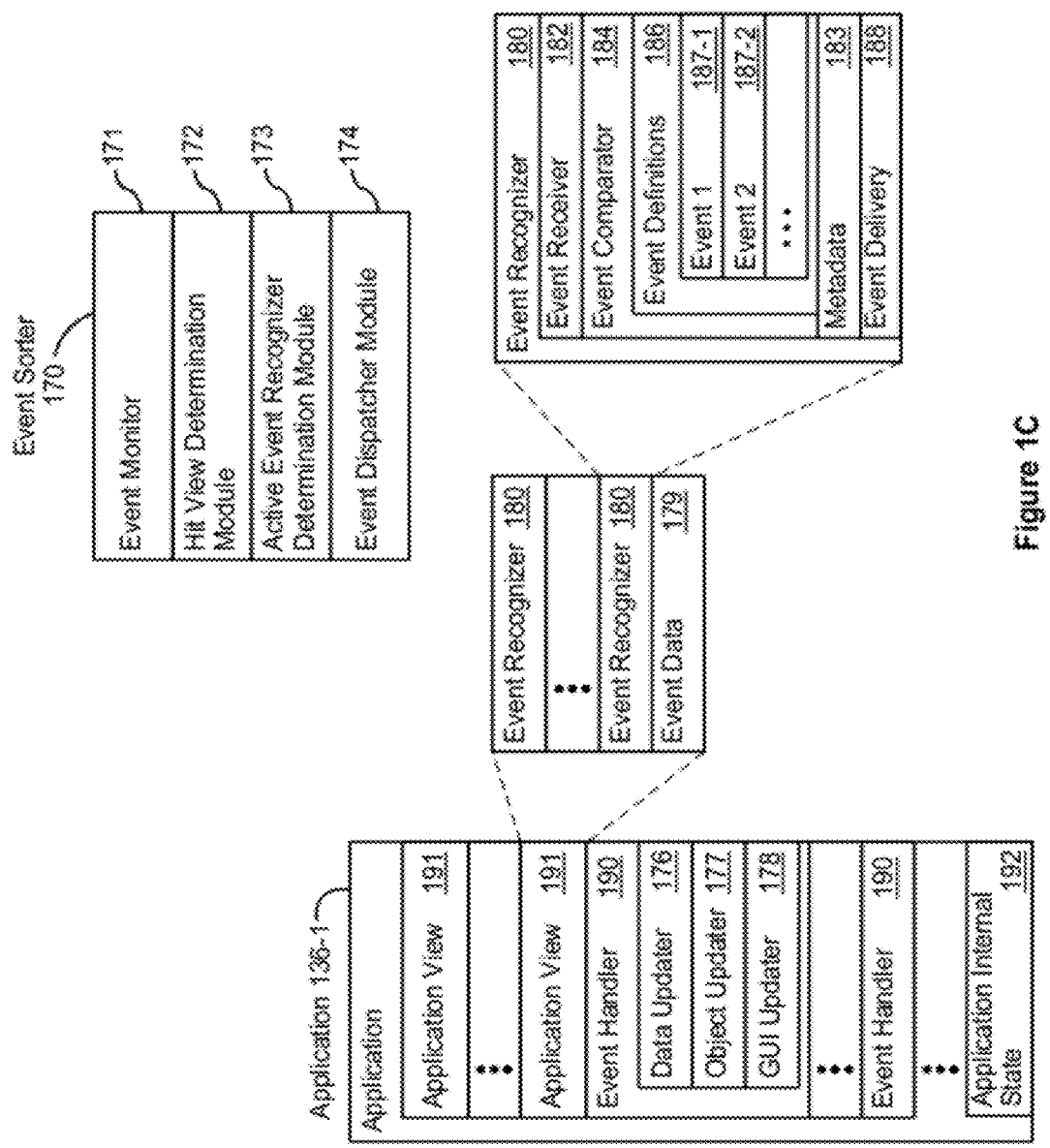
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
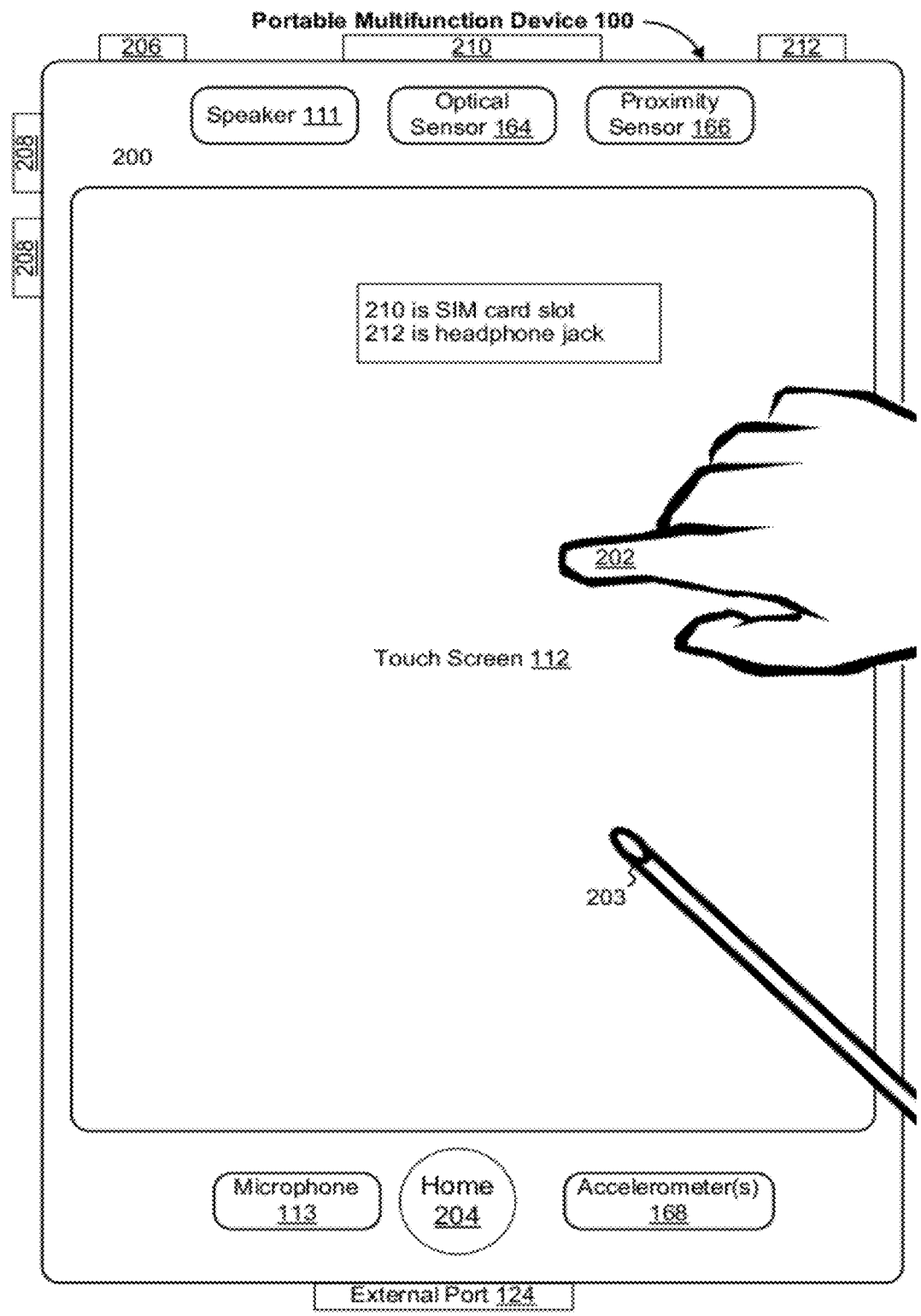
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
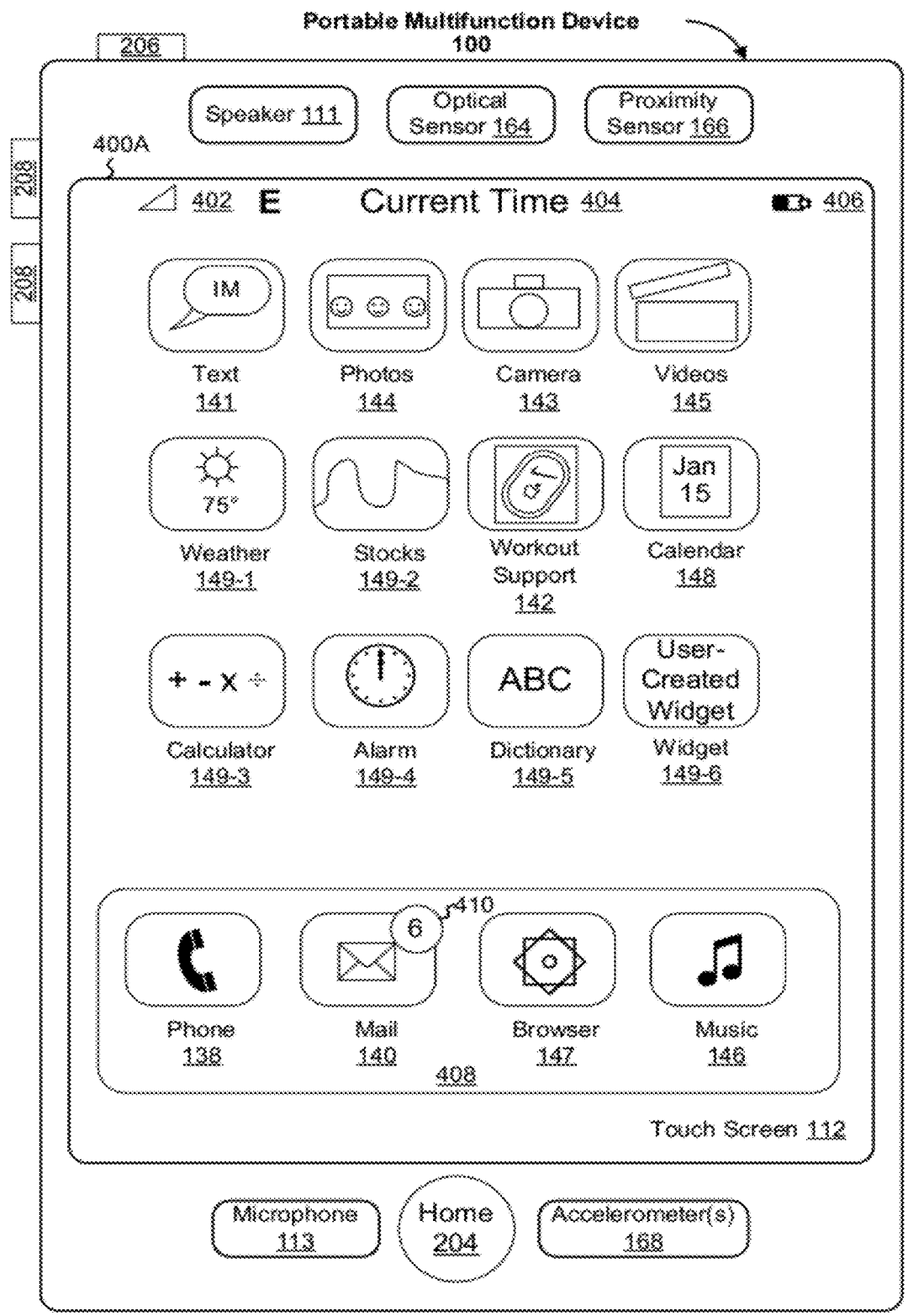
FIGS. 4A and 4B illustrate exemplary user interfaces for a menu of applications on a portable multifunction device in accordance with some embodiments.
Figure 4B:
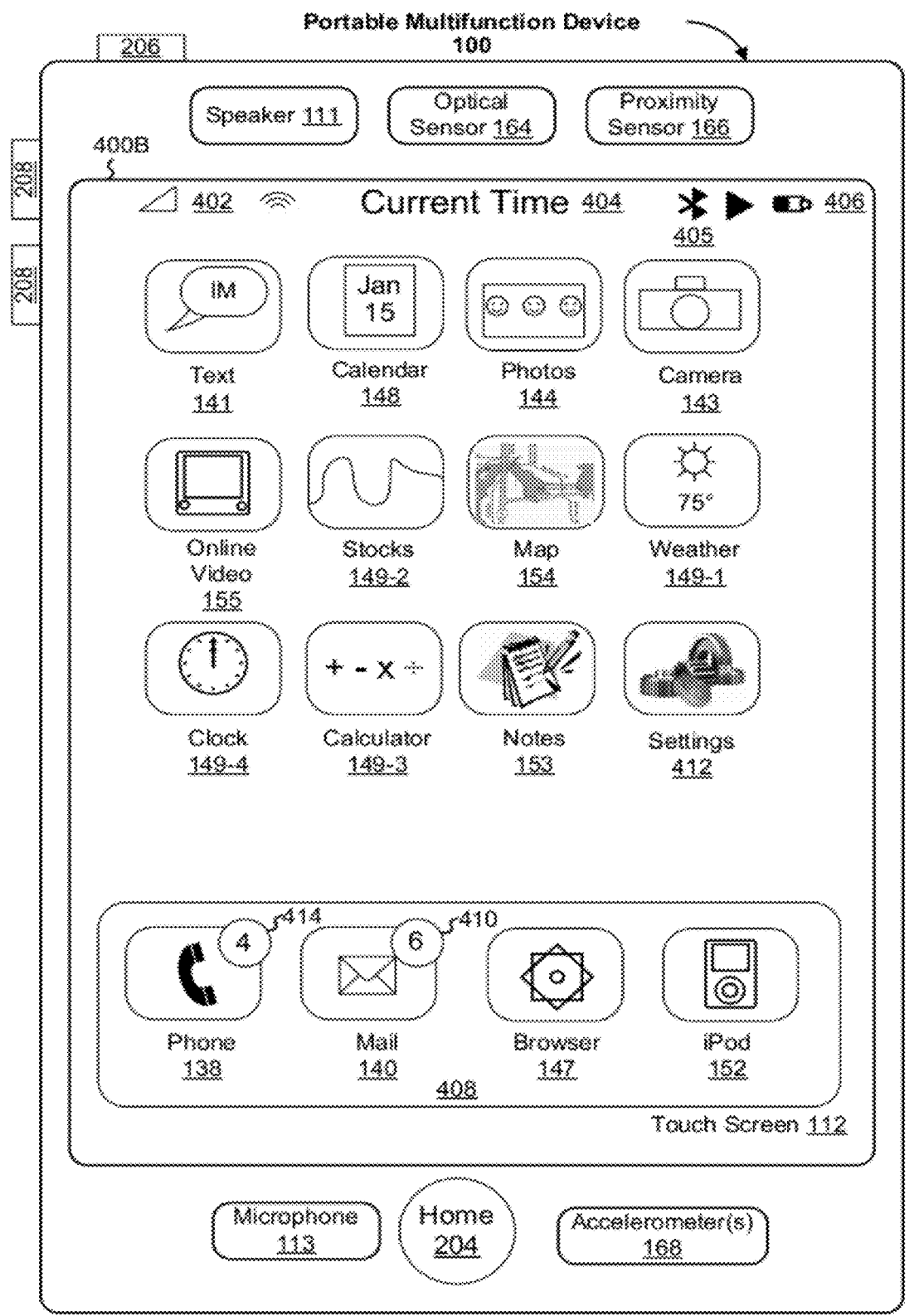

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for device 100 and its various applications 136, as described further below;
  Video and music player module 152, also referred to as iPod (trademark of Apple Inc.) module 152; and
  Online video module 155, also referred to as YouTube (trademark of Google Inc.) module 155.

Figure 4C:
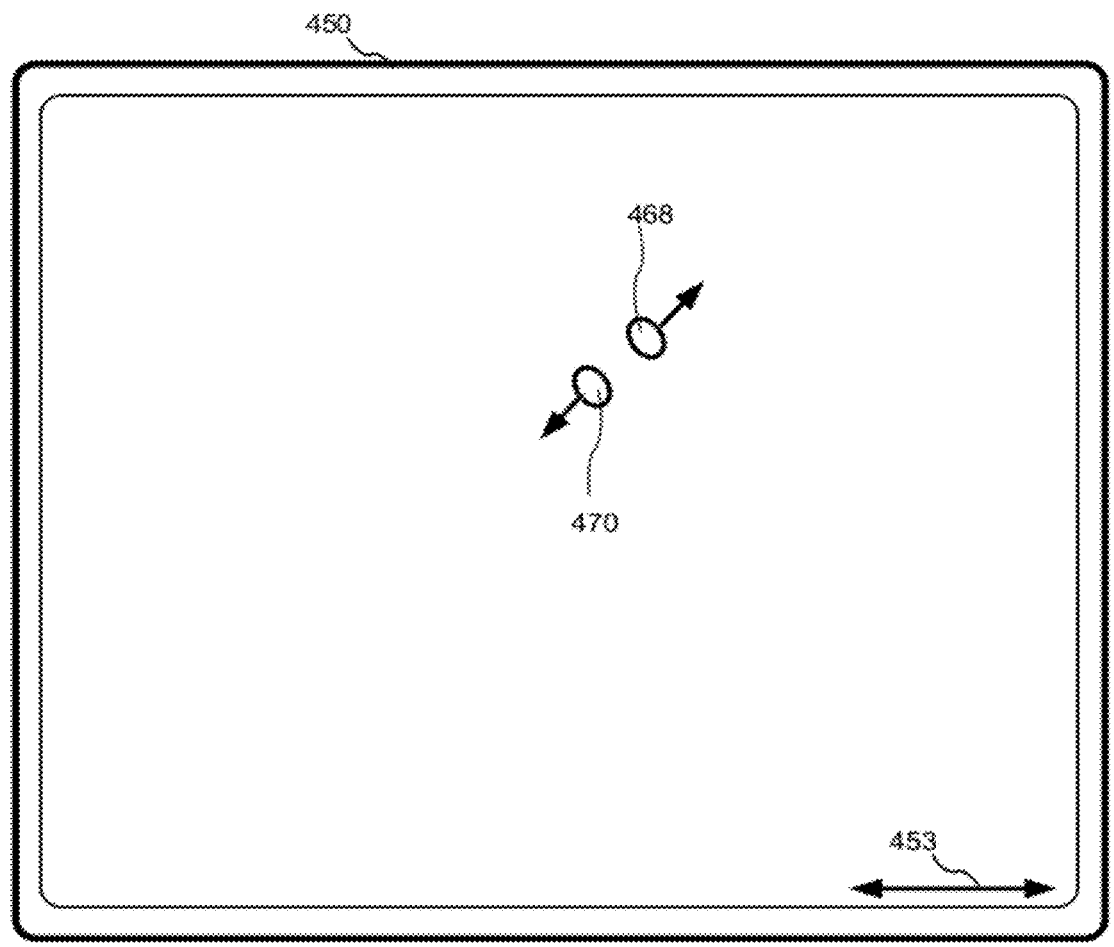
FIG. 4C illustrates an exemplary user interface for a multifunction device with a touch-sensitive surface that is separate from the display in accordance with some embodiments.
Figure 4C:
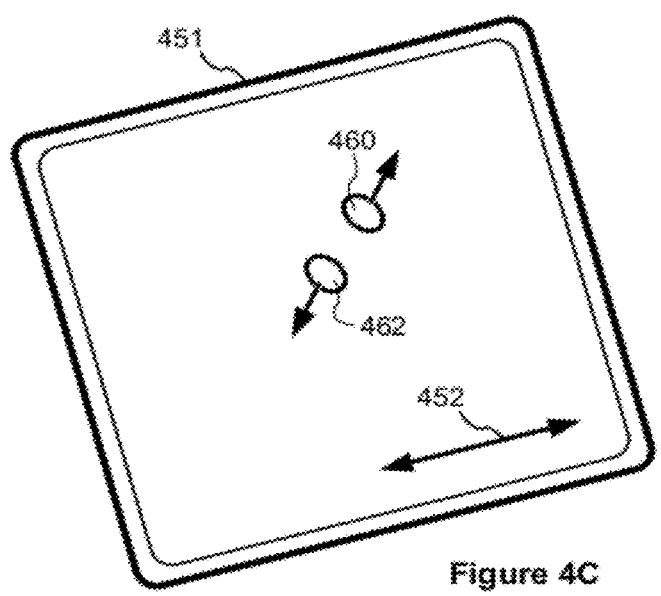

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

In FIGS. 5A-5J and FIGS. 7A-7D, the size of finger contacts or the distance of movements may be exaggerated for illustrative purposes. No depiction in the figures bearing on sizes or movements of finger contacts should be taken as a requirement or limitation for the purpose of understanding sizes and scale associated with the methods and devices disclosed herein.

FIGS. 5A-5J illustrate exemplary user interfaces for activating an item in a folder in accordance with some embodiments. The user interfaces in these figures are used to illustrate the processes described below, including the processes in FIGS. 6A-6B.

Figure 5A:
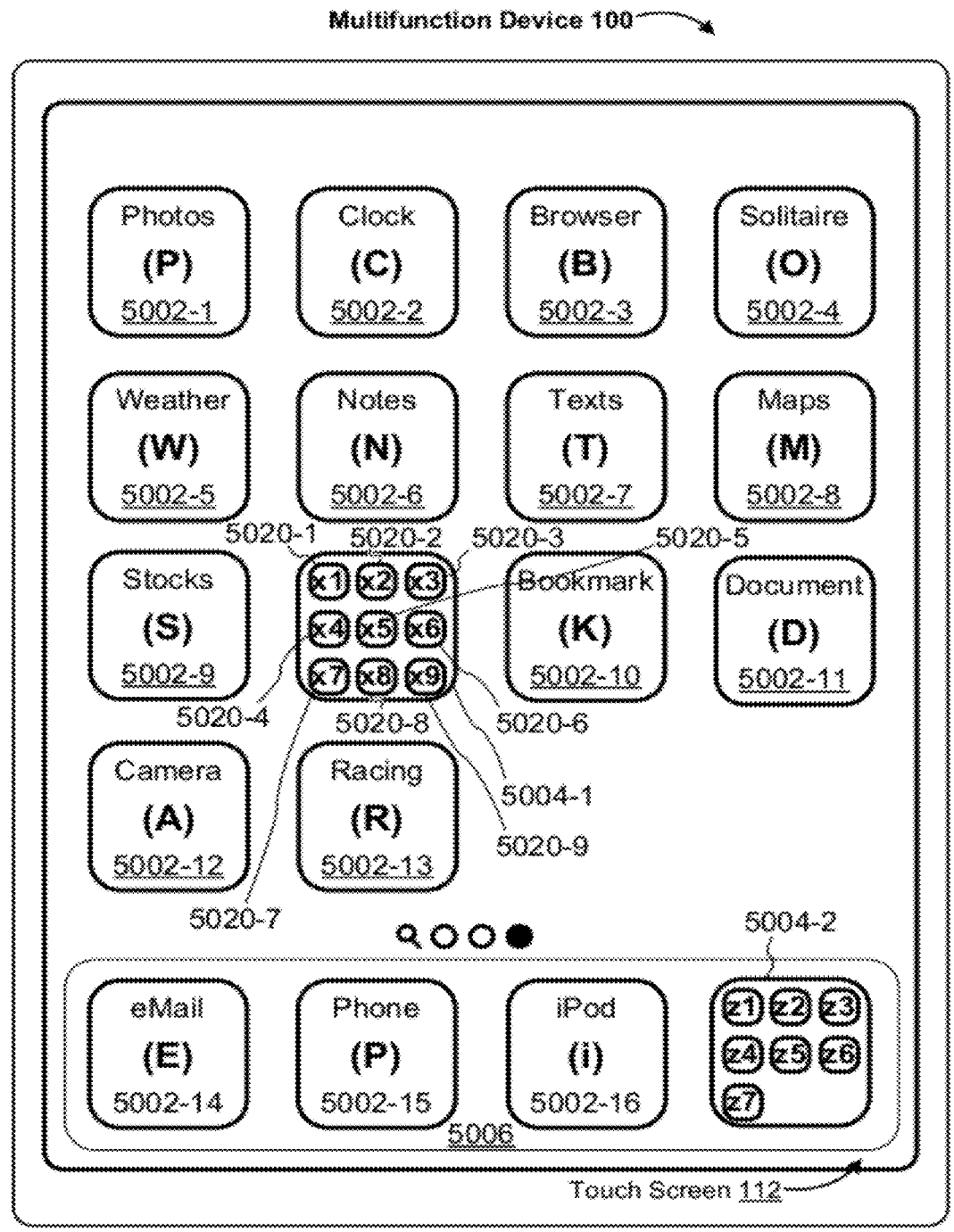
FIGS. 5A-5J illustrate exemplary user interfaces for activating an item in a folder in accordance with some embodiments.
Figure 6A:
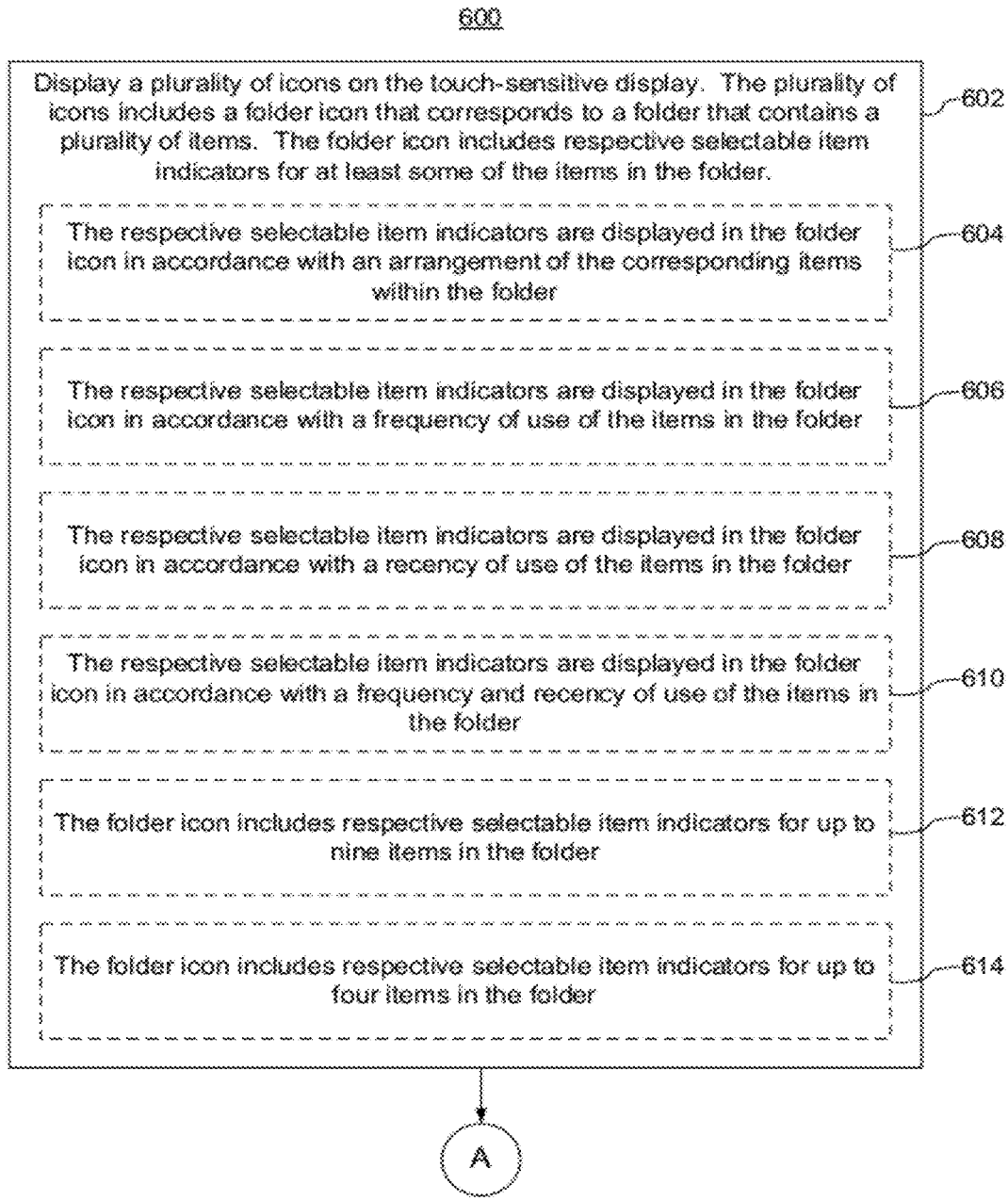
FIGS. 6A-6B are flow diagrams illustrating a method of activating an item in a folder in accordance with some embodiments.
Figure 6B:
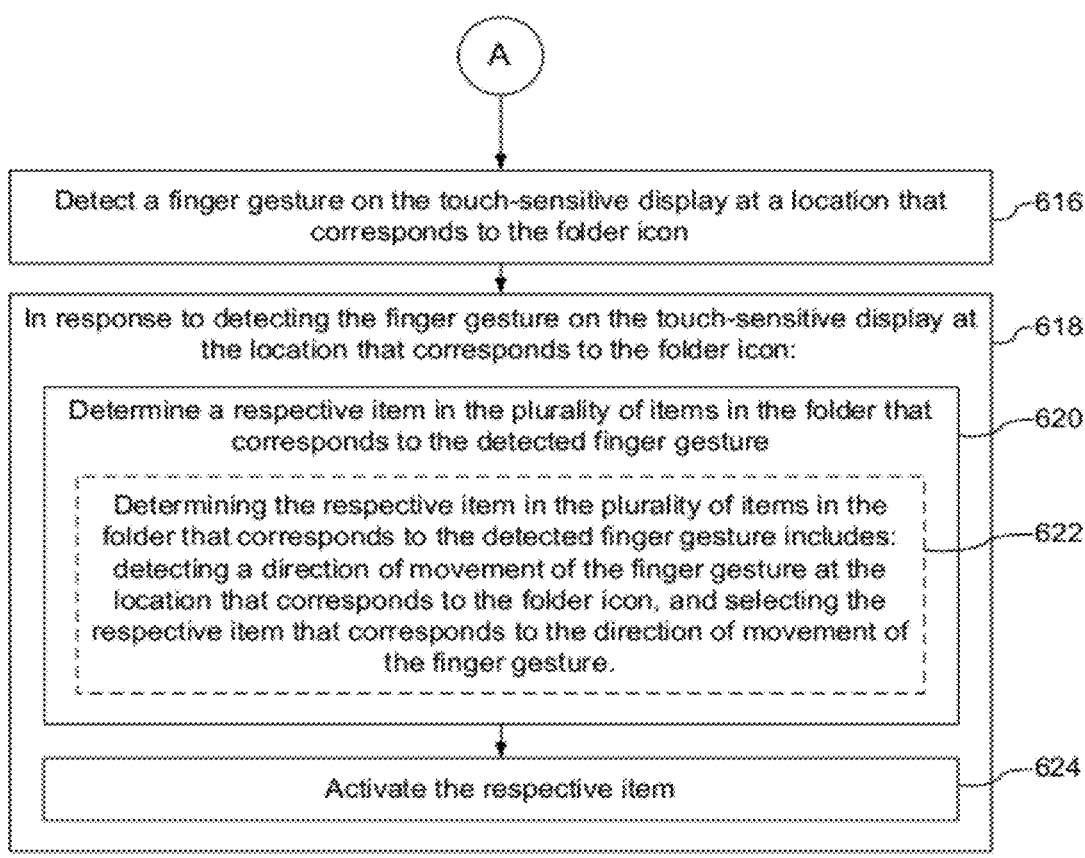

FIG. 5A depicts an exemplary user interface displaying a plurality of icons (e.g., application icons such as photos 5002-1, clock 5002-2, browser 5002-3, solitaire 5002-4, weather 5002-5, notes 5002-6, texts 5002-7, maps 5002-8, stocks 5002-9, bookmark 5002-10, document 5002-11, camera 5002-12, and racing 5002-13). The plurality of icons also includes one or more folder icons (e.g., 5004-1). A respective folder icon corresponds to a respective folder that contains a plurality of items. Folder icon 5004-1 includes nine respective selectable item indicators (e.g., "x1" 5020-1, "x2" 5020-2, "x3" 5020-3, "x4" 5020-4, "x5" 5020-5, "x6" 5020-6, "x7" 5020-7, "x8" 5020-8, and "x9" 5020-9) for respective items contained in the corresponding folder. In some embodiments, the respective selectable item indicator includes a thumbnail image of a corresponding item. For example, when the corresponding item is a photo, the selectable item indicator includes a thumbnail image of the photo. When the corresponding item is an application, the selectable item indicator includes a thumbnail image of a launch icon that corresponds to the application. In some embodiments, one or more icons are displayed in a tray (e.g., 5006), which is also sometimes referred to as a dock. In some embodiments, the plurality of icons outside tray 5006 is part of a plurality of set/pages of icons, where each set/page of icons includes a different plurality of icons. However, in some embodiments, when the device switches from a first set/page of icons to a second set/page of icons, tray 5006 does not change. In some embodiments, the icons in tray 5006 include one or more folder icons (e.g., 5004-2). Folder icon 5004-2 includes respective selectable item indicators (e.g., "z1", "z2", "z3", "z4", "z5", "z6", and "z7").

Figure 5B:
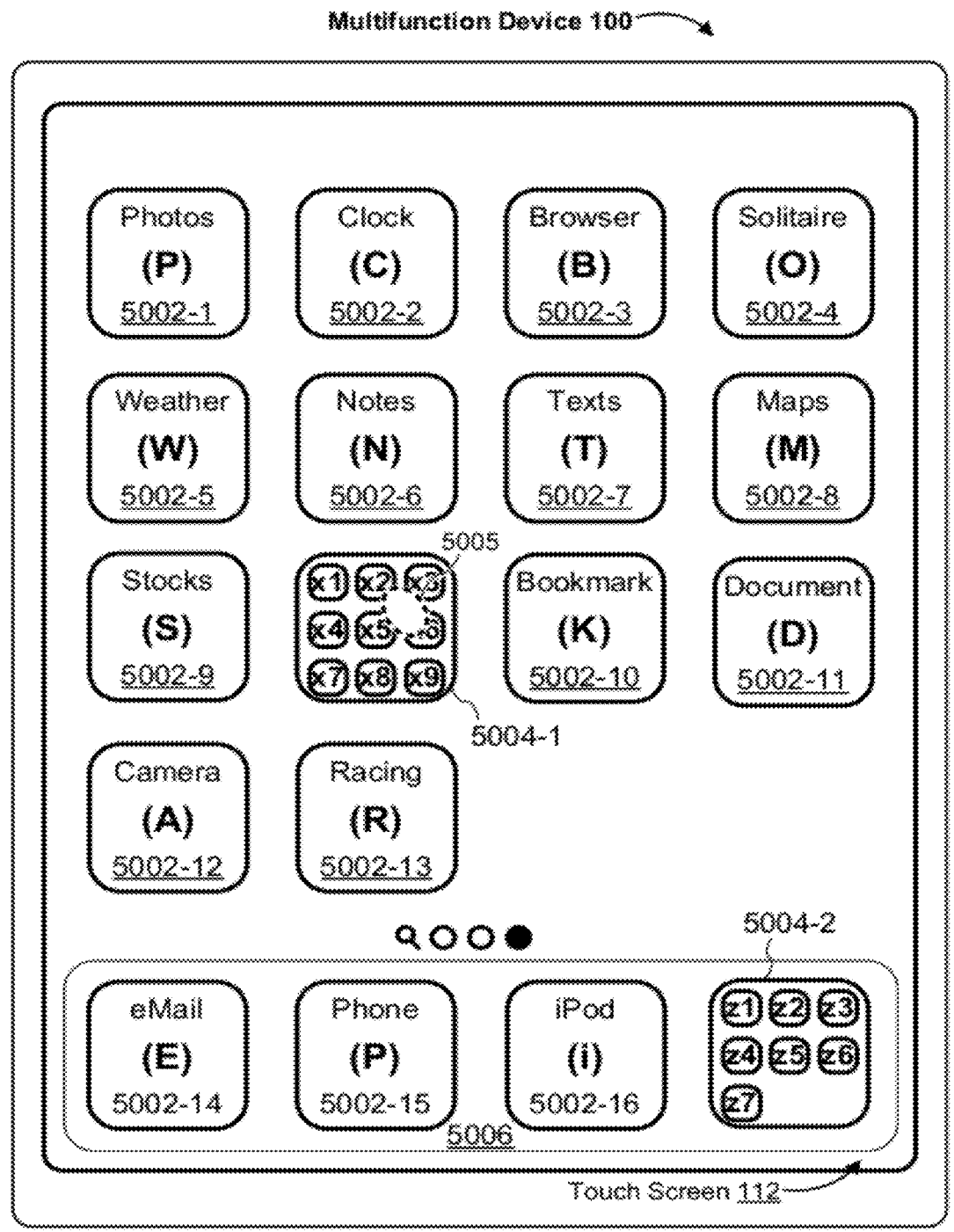
Figure 5C:
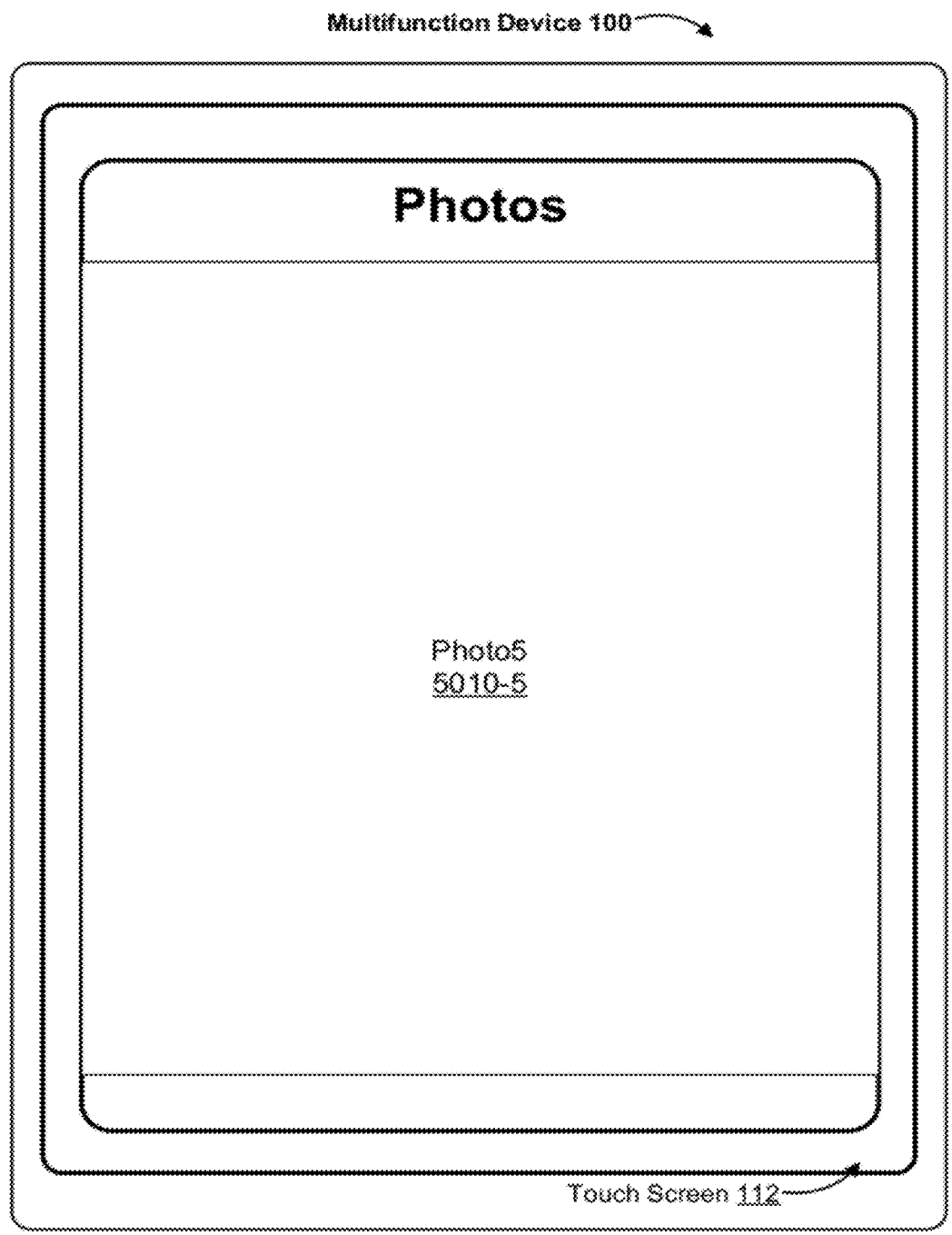

In FIG. 5B, gesture 5005 (e.g., a tap gesture) is detected on touch screen 112 at a location that corresponds to a location of folder icon 5004-1. FIG. 5C illustrates that in response to detecting gesture 5005, a corresponding item (e.g., Photo5 5010-5 that corresponds to a selectable item indicator "x5" 5020-5) is activated and displayed in a Photos application (e.g., using image management module 144).

Figure 5D:
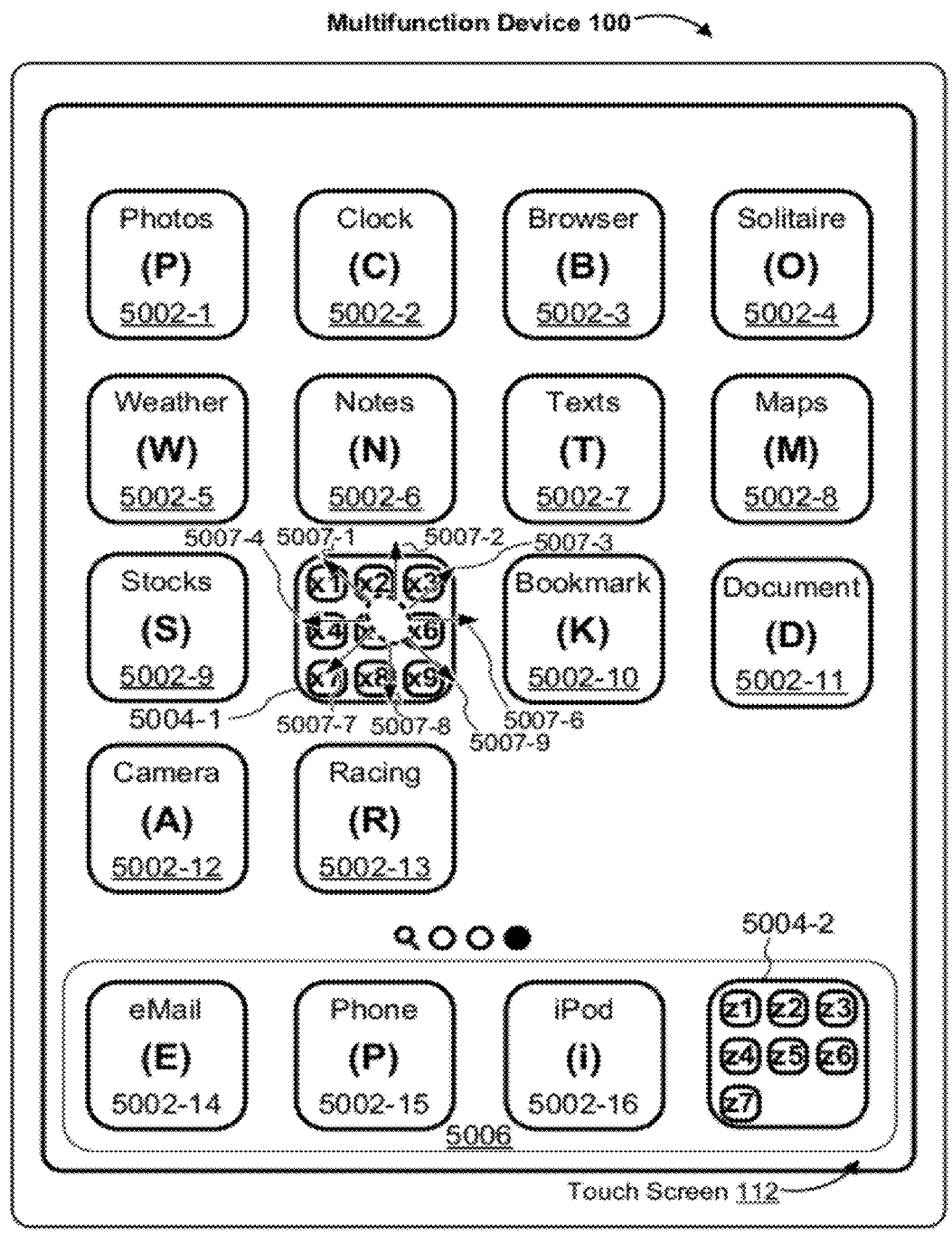
Figure 5E:
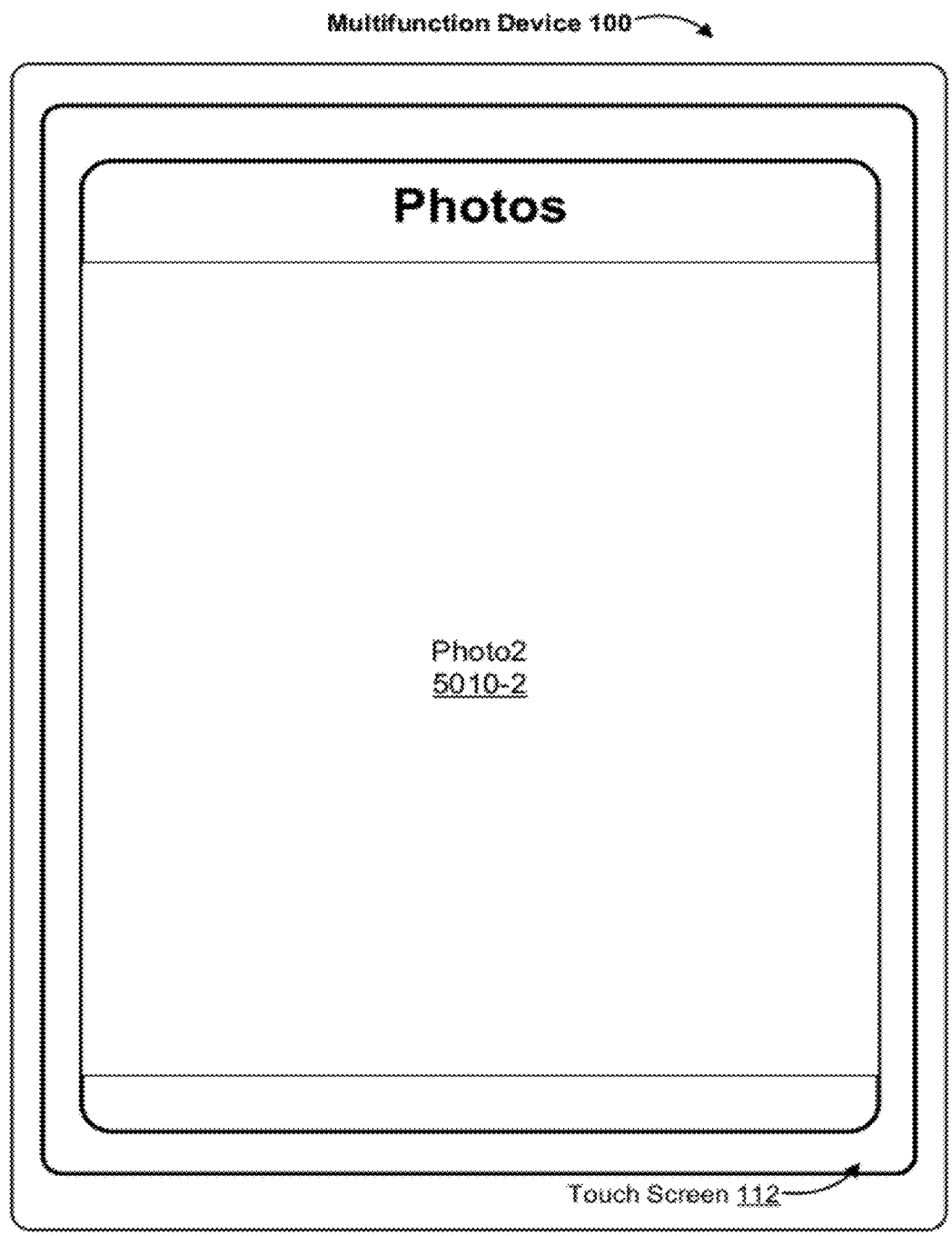
Figure 5F:
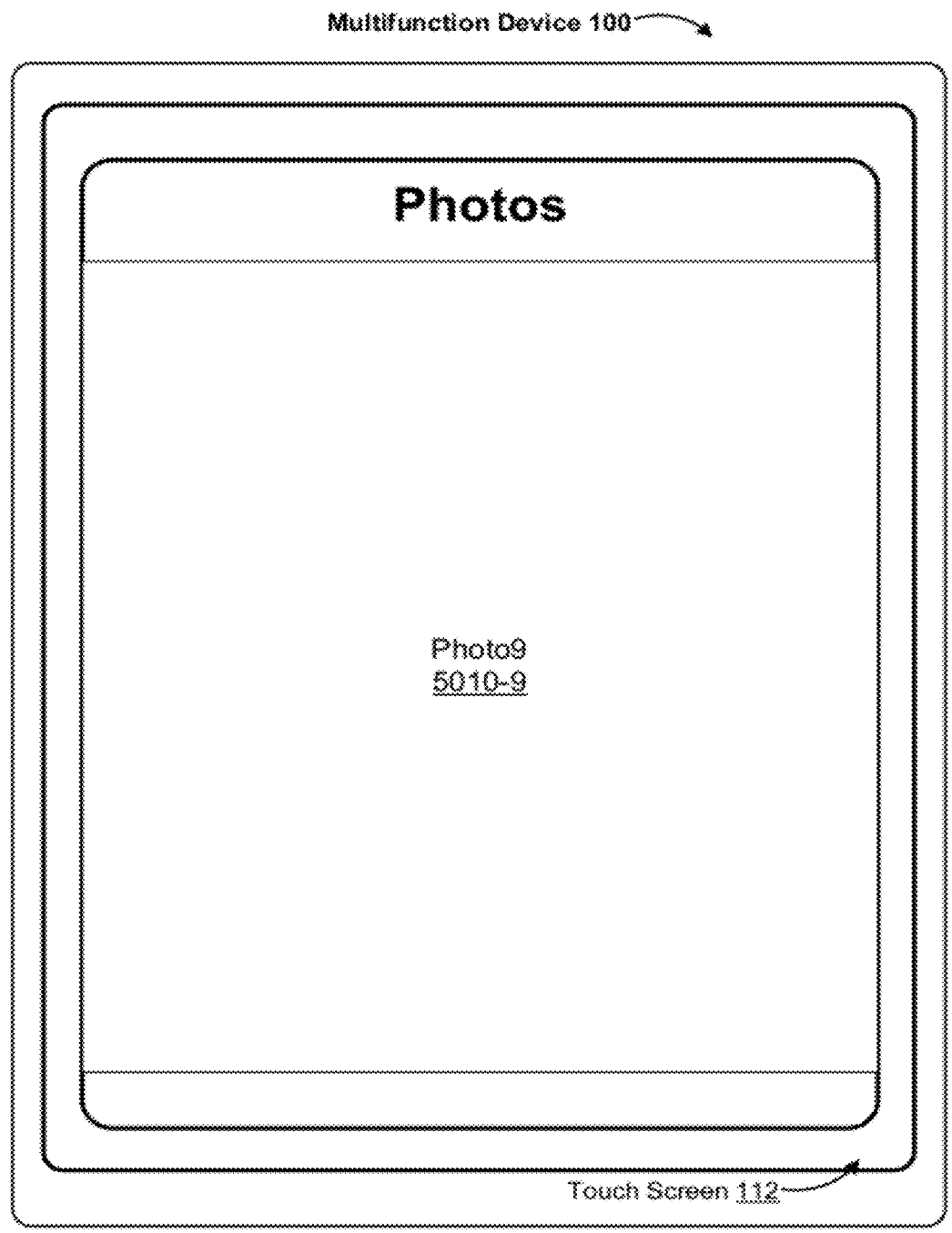

In FIG. 5D, a slide gesture (e.g., a drag, swipe, or flick gesture) is detected at a location that corresponds to the location of folder icon 5004-1. Depending on the direction of the slide gesture (e.g., upper-left 5007-1, up 5007-2, upper-right 5007-3, left 5007-4, right 5007-6, lower-left 5007-7, down 5007-8, or lower-right 5007-9), a respective item in a corresponding folder is selected and activated. For example, in response to detecting a slide-up gesture (e.g., 5007-2), Photo2 5010-2 that corresponds to selectable item indicator "x2" 5020-2 is activated and displayed in the Photos application, as illustrated in FIG. 5E. In response to detecting a lower-right slide gesture (e.g., 5007-9), Photo9 5010-9 that corresponds to the selectable item indicator "x9" 5020-9 is activated and displayed in the Photos application, as illustrated in FIG. 5F. In response to detecting an upper-left slide gesture (e.g., 5007-1), a photo that corresponds to selectable item indicator "x1" 5020-1 is activated and displayed (not shown). In response to detecting an upper-right slide gesture (e.g., 5007-3), a photo that corresponds to selectable item indicator "x3" 5020-3 is activated and displayed (not shown). In response to detecting a slide-left gesture (e.g., 5007-4), a photo that corresponds to a selectable item indicator "x4" 5020-4 is activated and displayed (not shown). In response to detecting a slide-right gesture (e.g., 5007-6), a photo that corresponds to a selectable item indicator "x6" 5020-6 is activated and displayed (not shown). In response to detecting a lower-left slide gesture (e.g., 5007-7), a photo that corresponds to a selectable item indicator "x7" 5020-7 is activated and displayed (not shown). In response to detecting a slide-down gesture (e.g., 5007-8), a photo that corresponds to a selectable item indicator "x8" 5020-8 is activated and displayed (not shown).

Figure 5G:
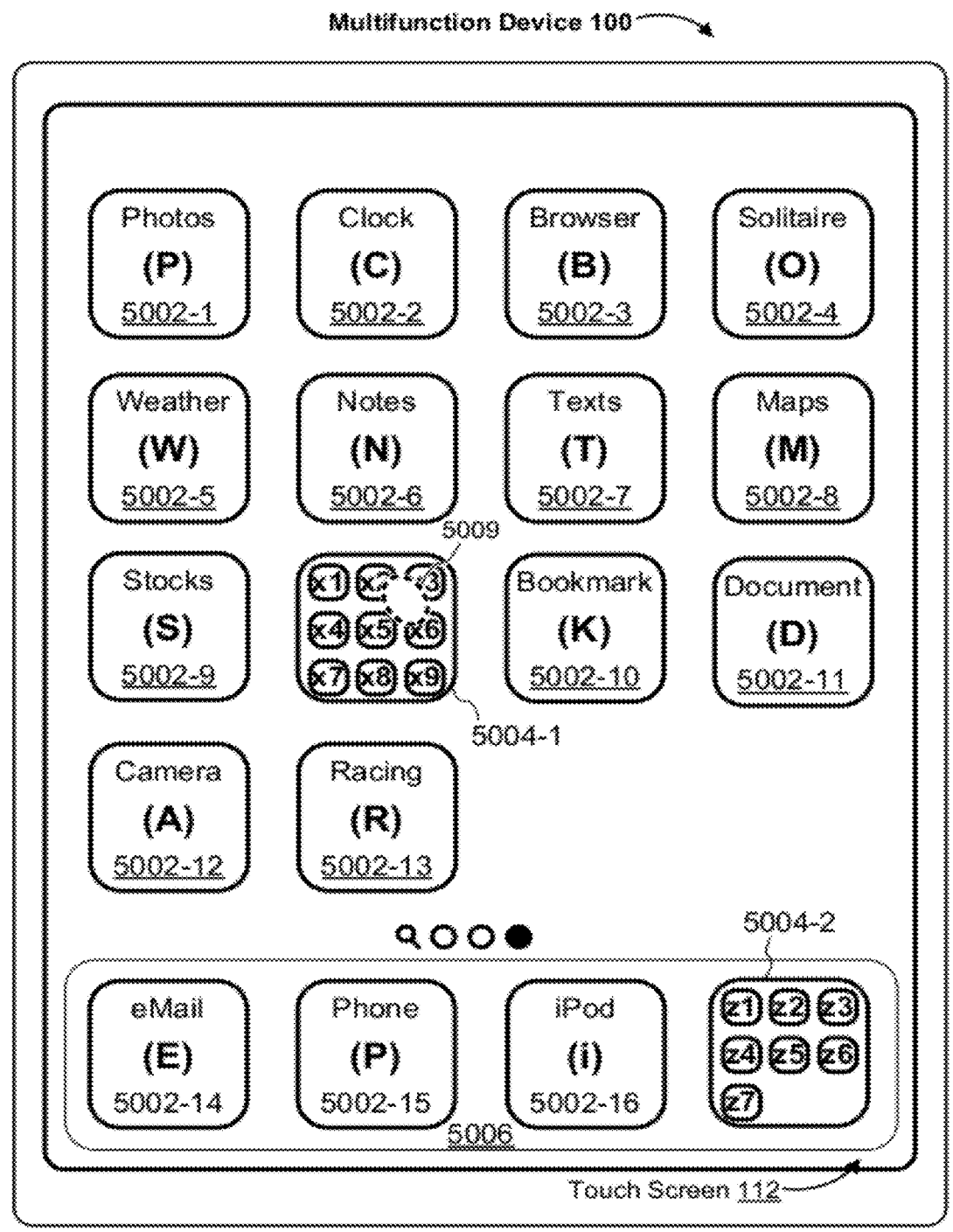
Figure 5H:
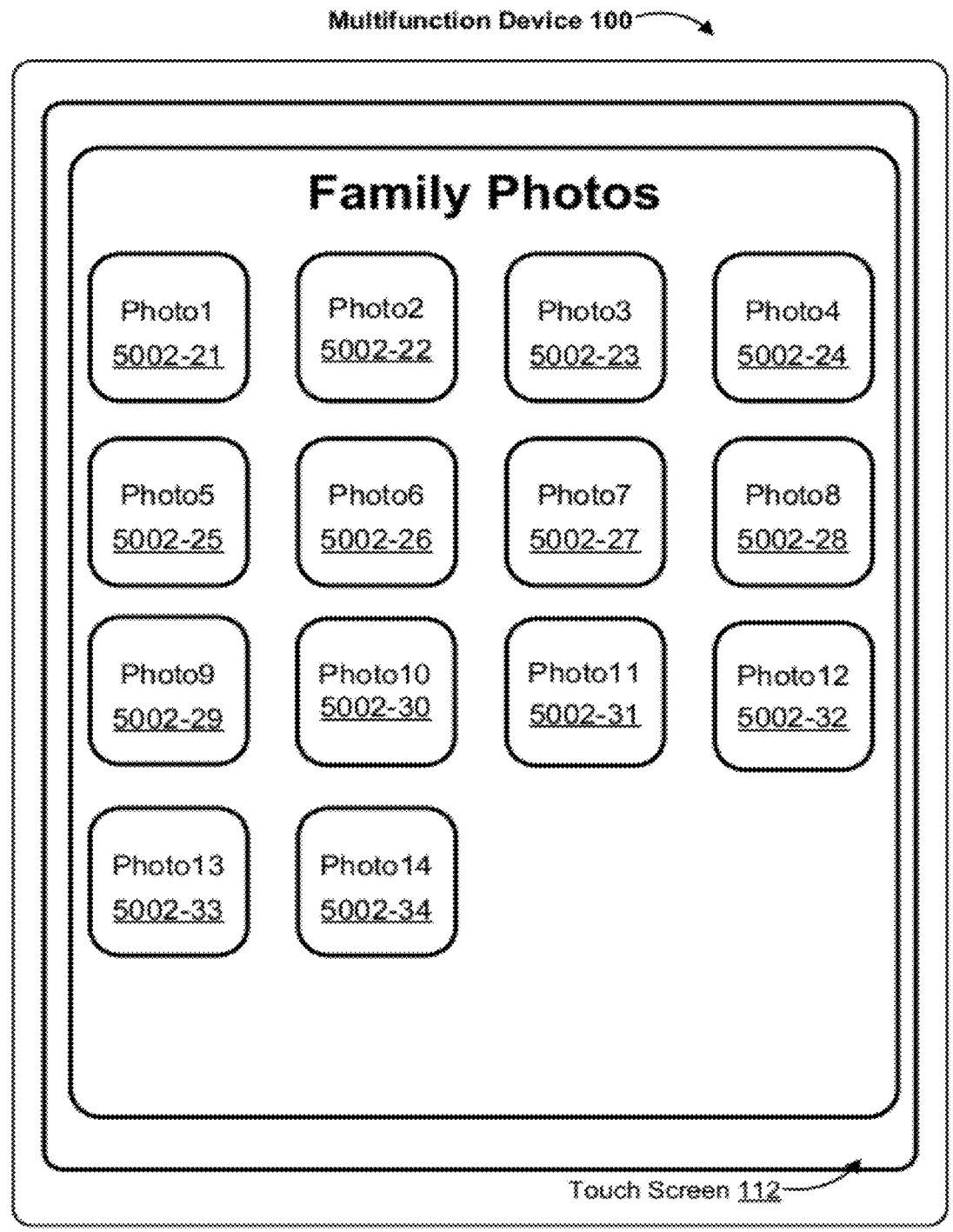
Figure 5I:
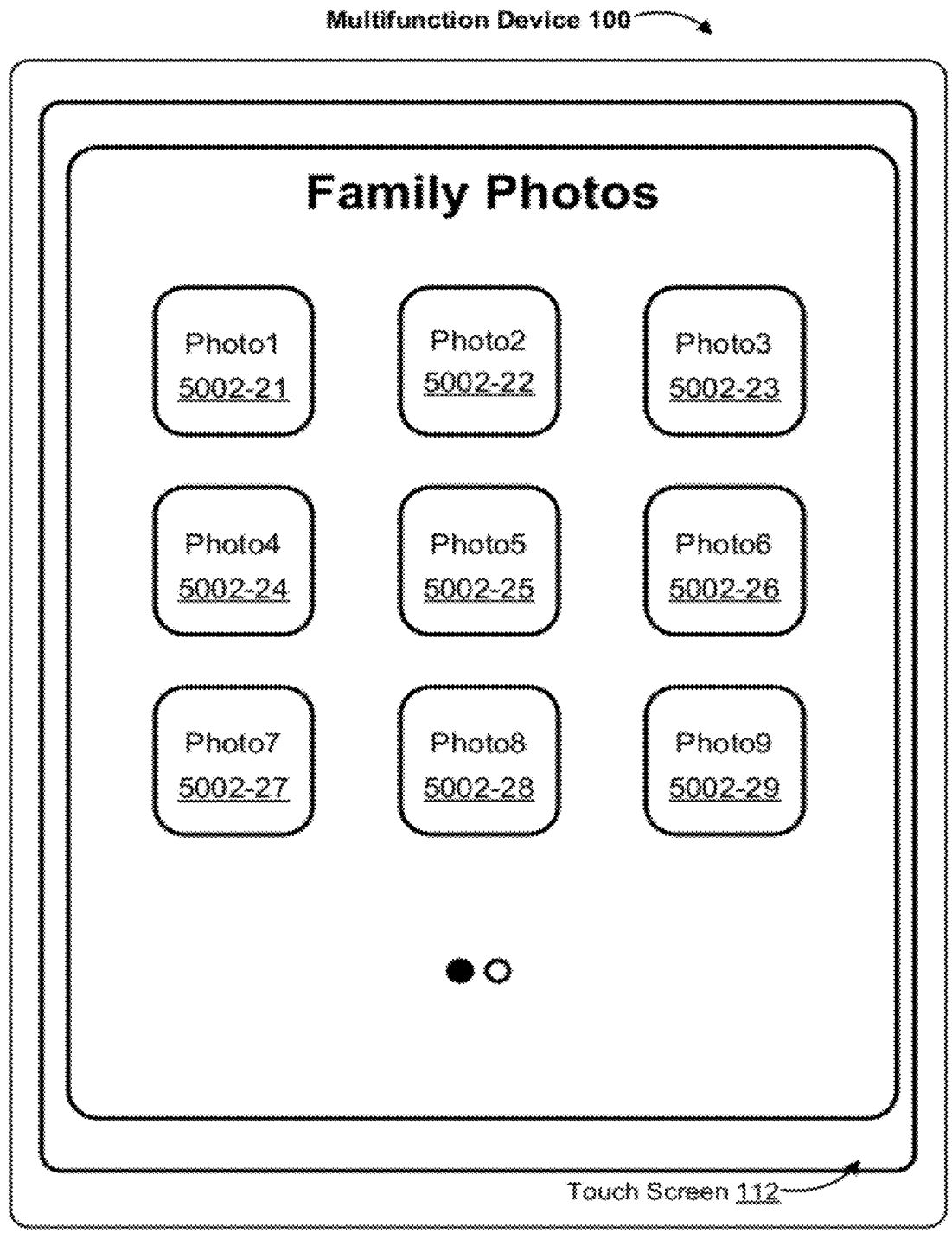

FIG. 5G illustrates a detection of another finger gesture 5009 (e.g., a press-and-hold gesture or a double-tap gesture) at a location that corresponds to the location of folder icon 5004-1. In response, icons for items in a folder "Family Photos" that corresponds to folder icon 5004-1 are displayed (e.g., in FIG. 5H or 5I). In FIG. 5H, the item icons are arranged in a 4-by-4 array. In FIG. 5I, the item icons are arranged in a 3-by-3 array. In some embodiments, a user can select a configuration to display item icons in a folder (e.g., a 4-by-4 array, 3-by-3 array, 3-by-4 array, or any other configuration).

Figure 5J:
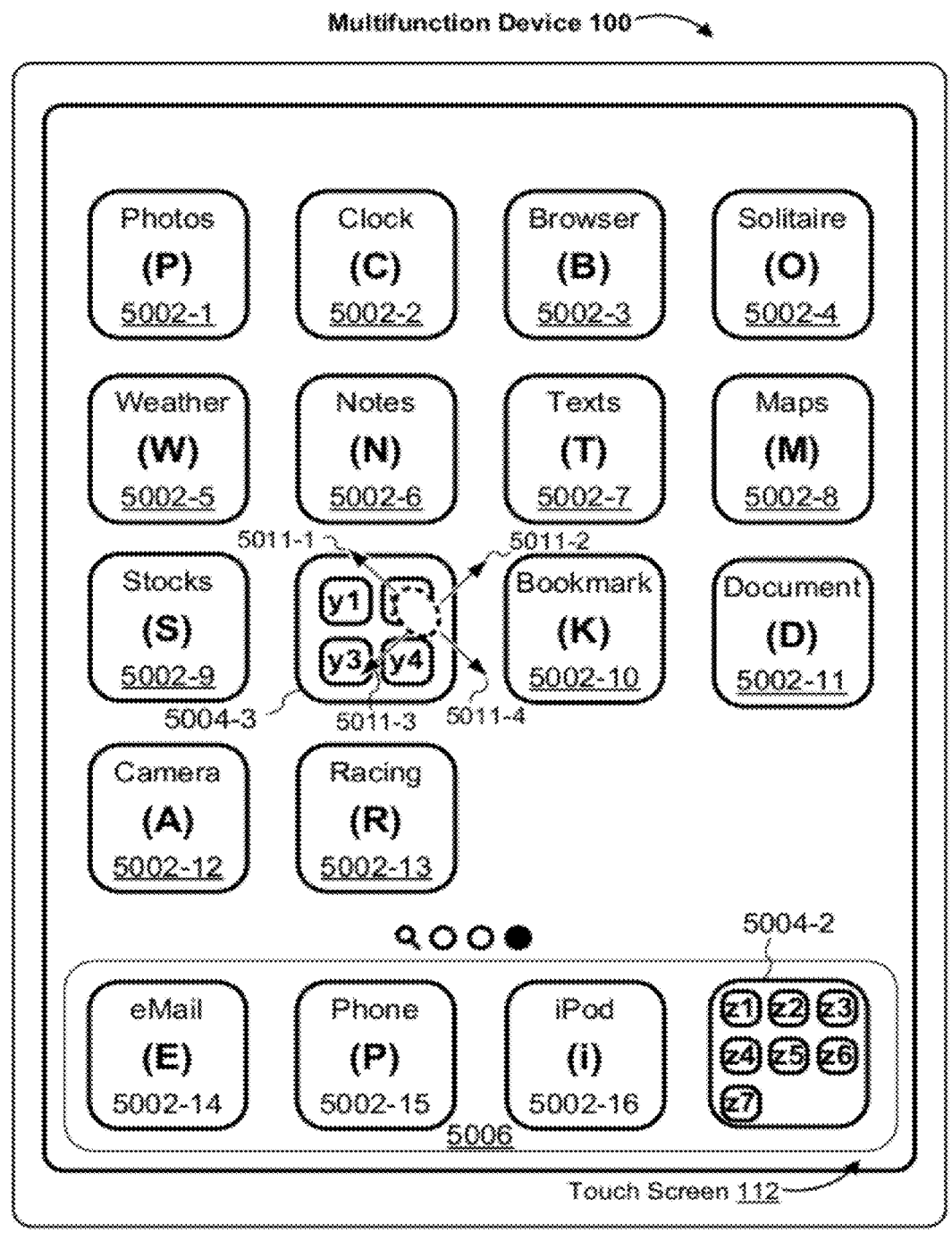

FIG. 5J depicts an exemplary user interface displaying a plurality of icons including folder icon 5004-3. Folder icon 5004-3 includes selectable item indicators "y1", "y2", "y3", and "y4." In FIG. 5J, a slide gesture (also called a drag, swipe, or flick gesture) is detected at a location that corresponds to a location of folder icon 5004-3. Depending on the direction of the slide gesture (e.g., upper-left 5011-1, upper-right 5011-2, lower-left 5011-3, or lower-right 5011-4), a respective item in a corresponding folder is selected and activated. For example, in response to detecting an upper-left slide gesture (e.g., 5011-1), an item that corresponds to the selectable item indicator "y1" is activated and displayed. In response to detecting an upper-right slide gesture (e.g., 5011-2), an item that corresponds to the selectable item indicator "y2" is activated and displayed. In response to detecting a lower-left slide gesture (e.g., 5011-3), an item that corresponds to the selectable item indicator "y3" is activated and displayed. In response to detecting a lower-right slide gesture (e.g., 5011-4), an item that corresponds to the selectable item indicator "y4" is activated and displayed.

FIGS. 6A-6B are flow diagrams illustrating method 600 of activating an item in a folder in accordance with some embodiments. Method 600 is performed at a portable electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to activate an item in a folder via a gesture on a folder icon, without opening the folder itself. The method provides a shortcut for activating an item in a folder, thereby creating a more efficient human-machine interface. For battery-operated computing devices, enabling a user to activate an item in a folder faster and more efficiently conserves power and increases the time between battery charges.

The device displays (602) a plurality of icons on the touch-sensitive display (e.g., icons 5002-1 through 5002-16 and icons 5004-1 and 5004-2 in FIG. 5A). The plurality of icons includes a folder icon that corresponds to a folder that contains a plurality of items (e.g., folder icon 5004-1 in FIG. 5A). In some embodiments, the plurality of icons includes a plurality of folder icons. The folder icon (e.g., 5004-1) includes respective selectable item indicators for at least some of the items in the folder (e.g., respective thumbnail images or other reduced scale representations of corresponding items in the folder, such as indicators 5020-1 through 5020-9 in FIG. 5A). In some embodiments, if the folder includes more items than the number of selectable item indicators that can be displayed in a folder icon (e.g., nine, six, four, etc.), the folder icon includes as many selectable item indicators as the number of selectable item indicators that can be displayed in the folder icon. In some embodiments, the device selects a subset of items that are contained in the folder up to the number of selectable item indicators that can be displayed in the folder icon, based on: a frequency of use of respective items in the folder, a recency of use of respective items in the folder, an importance of respective items in the folder, a user settings preference, and/or any other suitable criteria.

In some embodiments, the items in the folder are applications; digital content (e.g., digital images (such as photographic images and/or digital graphics), videos, music albums or individual tracks, audio books, and/or podcasts); electronic documents (e.g., word processing, spreadsheets, and/or presentation documents); and/or sub-folders.

In some embodiments, the respective selectable item indicators are displayed (604) in the folder icon in accordance with an arrangement of the corresponding items within the folder. For example, when the folder includes items Photo1, Photo2, Photo3, and Photo4, in that order, the selectable item indicators that correspond to Photo1, Photo2, Photo3, and Photo4 are displayed in the same order. The corresponding items may or may not be displayed in the same location in the folder as the corresponding locations of the selectable item indicators in the folder icon. For example, the selectable item indicators may be displayed in a 3-by-3 array in the folder icon, in which case the selectable item indicator corresponding to the Photo4 (e.g., 5020-4 in FIG. 5A) is displayed as a first item on a second row of the 3-by-3 array. In comparison, the corresponding items within the folder may be displayed in a 4-by-4 array, in which case the Photo4 (e.g., 5002-24 in FIG. 5H) is displayed as a fourth item on a first row of the 4-by-4 array.

In some embodiments, the respective selectable item indicators are displayed (606) in the folder icon in accordance with a frequency of use of the items in the folder. In some embodiments, a respective selectable item indicator that corresponds to an item in the folder with a highest frequency of use is displayed in a first position (e.g., top-left) in the folder icon. For example, when the folder includes items Photo1, Photo2, Photo3, and Photo4, and Photo2 is most frequently used item, followed by Photo4, Photo1, and lastly Photo3, the selectable item indicators are displayed in the order of Photo2, Photo4, Photo1, and Photo3.

In some embodiments, the respective selectable item indicators are displayed (608) in the folder icon in accordance with a recency of use of the items in the folder. In some embodiments, a respective selectable item indicator that corresponds to a most recently used item in the folder is displayed in a first position (e.g., top-left) in the folder icon. For example, when the folder includes items Photo1, Photo2, Photo3, and Photo4, and the Photo3 is most recently used, followed by Photo2, Photo4, and lastly Photo1, the selectable item indicators are displayed in the order of Photo3, Photo2, Photo4, and Photo1.

In some embodiments, the respective selectable item indicators are displayed (610) in the folder icon in accordance with a frequency and recency of use of the items in the folder. In some embodiments, the frequency of use of a respective item is converted to a first number, the recency of use is converted to a second number, and a combined score is determined in accordance with the first number and the second number. In some embodiments, the combined score is a weighted average of the first number and the second number. In some embodiments, a respective selectable item indicator that corresponds to an item with a highest combined score is displayed in a first position (e.g., top-left) in the folder icon.

In some embodiments, the folder icon includes (612) respective selectable item indicators for up to nine items in the folder (e.g., in FIG. 5A, folder icon 5004-1 includes nine selectable item indicators 5020-1 through 5020-9).

In some embodiments, the folder icon includes respective selectable item indicators for up to six items in the folder. In some embodiments, the folder icon includes respective selectable item indicators for at least six items in the folder.

In some embodiments, the folder icon includes (614) respective selectable item indicators for up to four items in the folder (e.g., in FIG. 5J, folder icon 5004-3 includes four selectable item indicators "y1", "y2", "y3", and "y4"). In some embodiments, the folder icon includes respective selectable item indicators for at least four items in the folder. In some embodiments, the device disregards a slide gesture if the folder does not include at least a predefined number of items (e.g., four items).

The device detects (616) a finger gesture on the touch-sensitive display at a location that corresponds to the folder icon (e.g., gesture 5007 at a location that corresponds to folder icon 5004-1 in FIG. 5D).

Operations 620-624 are performed in response to detecting the finger gesture on the touch-sensitive display at the location that corresponds to the folder icon (618).

The device determines (620) a respective item in the plurality of items in the folder that corresponds to the detected finger gesture.

In some embodiments, determining the respective item in the plurality of items in the folder that corresponds to the detected finger gesture includes (622): detecting a direction of movement of the finger gesture at the location that corresponds to the folder icon, and selecting the respective item that corresponds to the direction of movement of the finger gesture. For example, consider FIG. 5D, where the images (or selectable item indicators) in the folder icon are arranged in a 3-by-3 array, with the first image "x1" being the top-left element of the array, the second image "x2" being the top-middle element of the array, the third image "x3" being the top-right element, the fourth image "x4" being the left-middle element, the fifth image "x5" being the center element, the sixth image "x6" being the right-middle element, the seventh image "x7" being the bottom-left element, the eighth image "x8" being the bottom-middle element, and the ninth image "x9" being the bottom-right element. In this example, detecting a finger gesture (e.g., a drag, swipe, or flick gesture) that moves upwards and to the left (i.e., in a northwestern direction on the face of the touch-sensitive display, an upper-left slide gesture) on the location that corresponds to the folder icon selects and activates the item that corresponds to the first image. Similarly, detecting a finger gesture (e.g., a drag, swipe, or flick gesture) that moves straight upwards (i.e., in a northern direction on the face of the touch-sensitive display, a slide-up gesture) on the location that corresponds to the folder icon selects and activates the item that corresponds to the second image (e.g., FIG. 5D); detecting a finger gesture that moves straight upwards and to the right (i.e., in a northeastern direction on the face of the touch-sensitive display, an upper-right slide gesture) on the location that corresponds to the folder icon selects and activates the item that corresponds to the third image; detecting a finger gesture (e.g., a drag, swipe, or flick gesture) that moves left (i.e., in a western direction on the face of the touch-sensitive display, a slide-left gesture) on the location that corresponds to the folder icon selects and activates the item that corresponds to the fourth image; detecting a stationary finger gesture (e.g., a tap gesture) on the location that corresponds to the folder icon selects and activates the item that corresponds to the fifth image (e.g., FIGS. 5B-5C); detecting a finger gesture (e.g., a drag, swipe, or flick gesture) that moves right (i.e., in a eastern direction on the face of the touch-sensitive display, a slide-right gesture) on the location that corresponds to the folder icon selects and activates the item that corresponds to the sixth image; detecting a finger gesture (e.g., a drag, swipe, or flick gesture) that moves downwards and to the left (i.e., in a southwestern direction on the face of the touch-sensitive display, a lower-left slide gesture) on the location that corresponds to the folder icon selects and activates the item that corresponds to the seventh image; detecting a finger gesture (e.g., a drag, swipe, or flick gesture) that moves straight downwards (i.e., in a southern direction on the face of the touch-sensitive display, a slide-down gesture) on the location that corresponds to the folder icon selects and activates the item that corresponds to the eighth image; and detecting a finger gesture (e.g., a drag, swipe, or flick gesture) that moves downwards and to the right (i.e., in a southeastern direction on the face of the touch-sensitive display, a lower-right slide gesture) on the location that corresponds to the folder icon selects and activates the item that corresponds to the ninth image (e.g., FIG. 5E).

As another example, consider FIG. 5J, where the images (or selectable item indicators) in the folder icon are arranged in a 2-by-2 array, with the first image "y1" being the top-left element of the array, the second image "y2" being the top-right element, the third image "y3" being the bottom-left element, and the fourth image "y4" being the bottom-right element. In this example, detecting a finger gesture (e.g., a drag, swipe, or flick gesture) that moves upwards and to the left (i.e., in a northwestern direction on the face of the touch-sensitive display, an upper-left slide gesture) on the location that corresponds to the folder icon selects and activates the item that corresponds to the first image. Similarly, detecting a finger gesture (e.g., a drag, swipe, or flick gesture) that moves straight upwards and to the right (i.e., in a northeastern direction on the face of the touch-sensitive display, an upper-right slide gesture) on the location that corresponds to the folder icon selects and activates the item that corresponds to the second image; detecting a finger gesture (e.g., a drag, swipe, or flick gesture) that moves downwards and to the left (i.e., in a southwestern direction on the face of the touch-sensitive display, a lower-left slide gesture) on the location that corresponds to the folder icon selects and activates the item that corresponds to the third image; and detecting a finger gesture (e.g., a drag, swipe, or flick gesture) that moves downwards and to the right (i.e., in a southeastern direction on the face of the touch-sensitive display, a lower-right slide gesture) on the location that corresponds to the folder icon selects and activates the item that corresponds to the fourth image. In some embodiments, a tap gesture or a slide gesture in any direction that does not correspond to any of items in the folder (e.g., up, down, left, or right) is disregarded (i.e., no operation is performed in response). In some embodiments, a tap gesture or a slide gesture in a direction that does not correspond to any of items in the folder (e.g., up, down, left, or right) initiates another operation (e.g., displaying items in the folder, moving the folder, deleting the folder, etc.).

In yet another example, the images (or selectable item indicators) in the folder icon are arranged in a 3-by-2 array, with the first image being the top-left element of the array, the second image being the top-middle element of the array, the third image being the top-right element, the fourth image being the bottom-left element, the fifth image being the bottom-middle element, and the sixth image being the bottom-right element. In this example, detecting a finger gesture (e.g., a drag, swipe, or flick gesture) that moves upwards and to the left (i.e., in a northwestern direction on the face of the touch-sensitive display, an upper-left slide gesture) on the location that corresponds to the folder icon selects and activates the item that corresponds to the first image. Similarly, detecting a finger gesture (e.g., a drag, swipe, or flick gesture) that moves straight upwards (i.e., in a northern direction on the face of the touch-sensitive display, a slide-up gesture) on the location that corresponds to the folder icon selects and activates the item that corresponds to the second image; detecting a finger gesture that moves straight upwards and to the right (i.e., in a northeastern direction on the face of the touch-sensitive display, an upper-right slide gesture) on the location that corresponds to the folder icon selects and activates the item that corresponds to the third image; detecting a finger gesture (e.g., a drag, swipe, or flick gesture) that moves downwards and to the left (i.e., in a southwestern direction on the face of the touch-sensitive display, a lower-left slide gesture) on the location that corresponds to the folder icon selects and activates the item that corresponds to the fourth image; detecting a finger gesture (e.g., a drag, swipe, or flick gesture) that moves straight downwards (i.e., in a southern direction on the face of the touch-sensitive display, a slide-down gesture) on the location that corresponds to the folder icon selects and activates the item that corresponds to the fifth image; and detecting a finger gesture (e.g., a drag, swipe, or flick gesture) that moves downwards and to the right (i.e., in a southeastern direction on the face of the touch-sensitive display, a lower-right slide gesture) on the location that corresponds to the folder icon selects and activates the item that corresponds to the sixth image. In some embodiments, a tap gesture and a slide gesture in any direction that does not correspond to any of items in the folder (e.g., left or right) are disregarded (i.e., no operation is performed in response). In some embodiments, a tap gesture and a slide gesture in a direction that does not correspond to any of items in the folder (e.g., left or right) initiates another operation (e.g., displaying items in the folder, moving the folder, deleting the folder, etc.).

Similarly, the images (or selectable item indicators) in the folder icon area can be arranged in a 2-by-3 array, and analogous finger gestures (e.g., a drag, swipe, or flick gesture) selects and activates corresponding items.

In some embodiments, determining the respective item in the plurality of items in the folder that corresponds to the detected finger gesture includes determining a first item in the plurality of items as the respective item when the finger gesture is a single tap gesture; and determining a second item in the plurality of items as the respective item when the finger gesture is a double-tap gesture, etc. For example, in some embodiments, an item that corresponds to "x1" 5020-1 is determined as the respective item when the finger gesture is a single tap gesture, and an item that corresponds to "x2" 5020-2 is determined as the respective item when the finger gesture is a double-tap gesture, etc.

The device activates (624) the respective item. When the respective item includes playable data (e.g., music, video, or any other multimedia data), activating the respective item includes playing the respective item. When the respective item is an application, activating the item includes launching the application if the application is not already launched. If the application is already launched, the application is displayed. When the respective item is digital content or an electronic document, activating the item includes launching an application that displays the digital content or electronic document if the application is not already launched. If the application is already launched, the digital content or electronic document is displayed using the application. When the respective item is a sub-folder, activating the respective item includes displaying items in the sub-folder. As noted above, this streamlines the item activation processes by activating an item in a folder with a single gesture on the folder icon, thereby eliminating the need for extra, separate steps to open the folder. Thus, this process reduces the cognitive burden on a user and produces a more efficient human-machine interface.

FIGS. 7A-7D illustrate exemplary user interfaces for displaying a contact icon and responding to activation of the contact icon in accordance with some embodiments. The user interfaces in these figures are used to illustrate the processes described below, including the processes in FIGS. 8A-8B.

Many electronic devices with graphical user interfaces store contacts and contact information (e.g., phone number, address, etc.). A user may need to call a contact or read messages from the contact. Existing methods for calling a contact or displaying messages typically require a sequence of user inputs to call the contact, or display the messages. For example, to call a contact, a user typically needs to select a contacts icon to display a list of contacts. After displaying the list of contacts, the user needs to select a contact for a call. Then the user needs to activate a call icon to initiate the calling process. As another example, to display messages from a contact, the user typically needs to select a messages icon to launch or display a message application. While displaying the message application, the user needs to select the contact to display messages sent from the contact. In the embodiments described below, an improved method for responding to activation of a contact icon is achieved by displaying a contact icon that is configured to display a missed call indicia and an instant message indicia. Detection of a finger gesture on the contact icon initiates a call to the contact when the missed call indicia is displayed without concurrent display of the instant message indicia, while detection of the finger gesture on the contact icon displays the instant message from the contact when the instant message indicia is displayed without concurrent display of the missed call indicia. This method streamlines the call/message display processes by responding to activation of a contact icon with distinct applications (e.g., calling or instant messaging) depending on the recent communications received by those applications, thereby eliminating the need for extra, separate steps to perform call or message display processes. In addition, this method uses a single, simple gesture to initiate distinct functions associated with the contact icon, thereby eliminating the need to memorize respective gestures for respective functions.

Figure 7A:
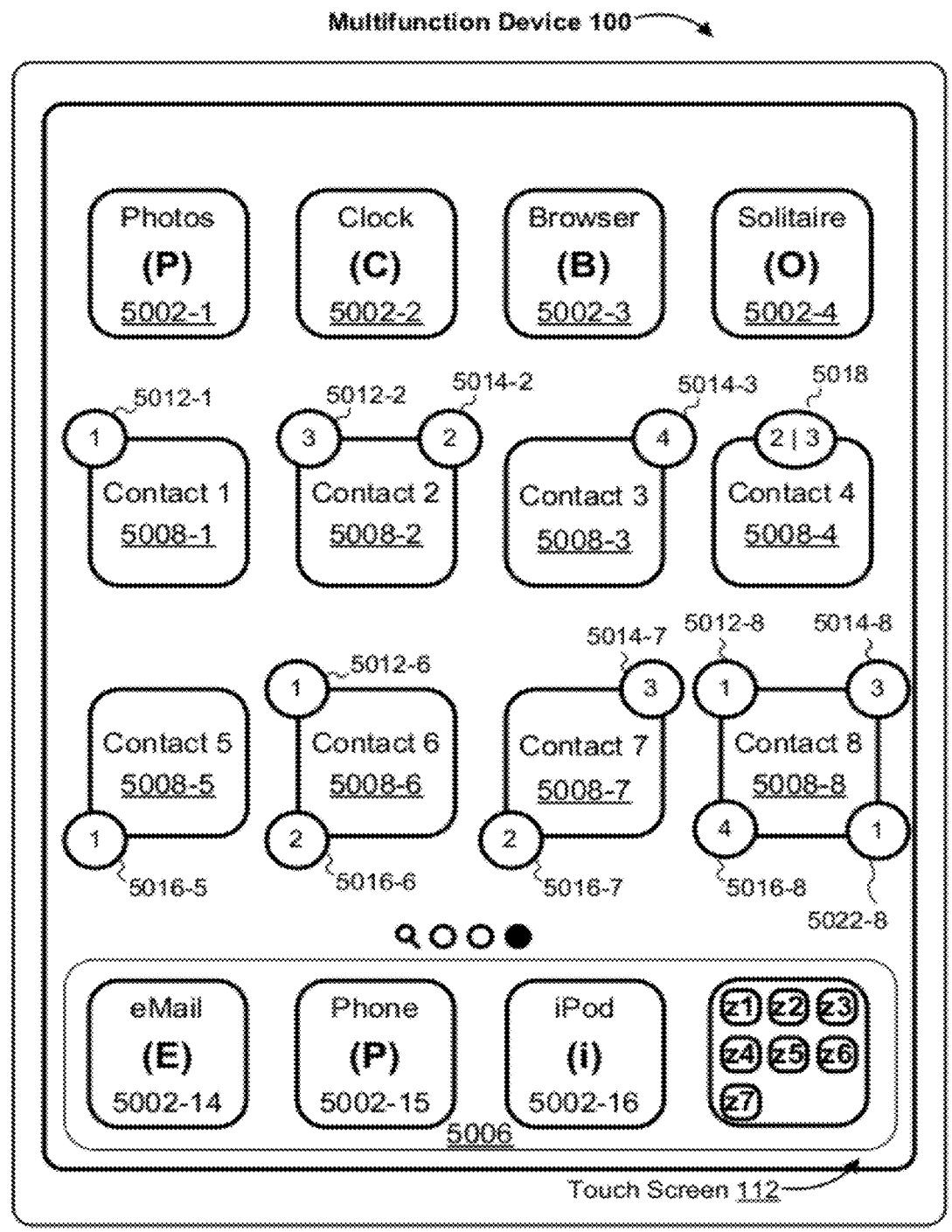
FIGS. 7A-7D illustrate exemplary user interfaces for displaying a contact icon and responding to activation of the contact icon in accordance with some embodiments.
Figure 8A:
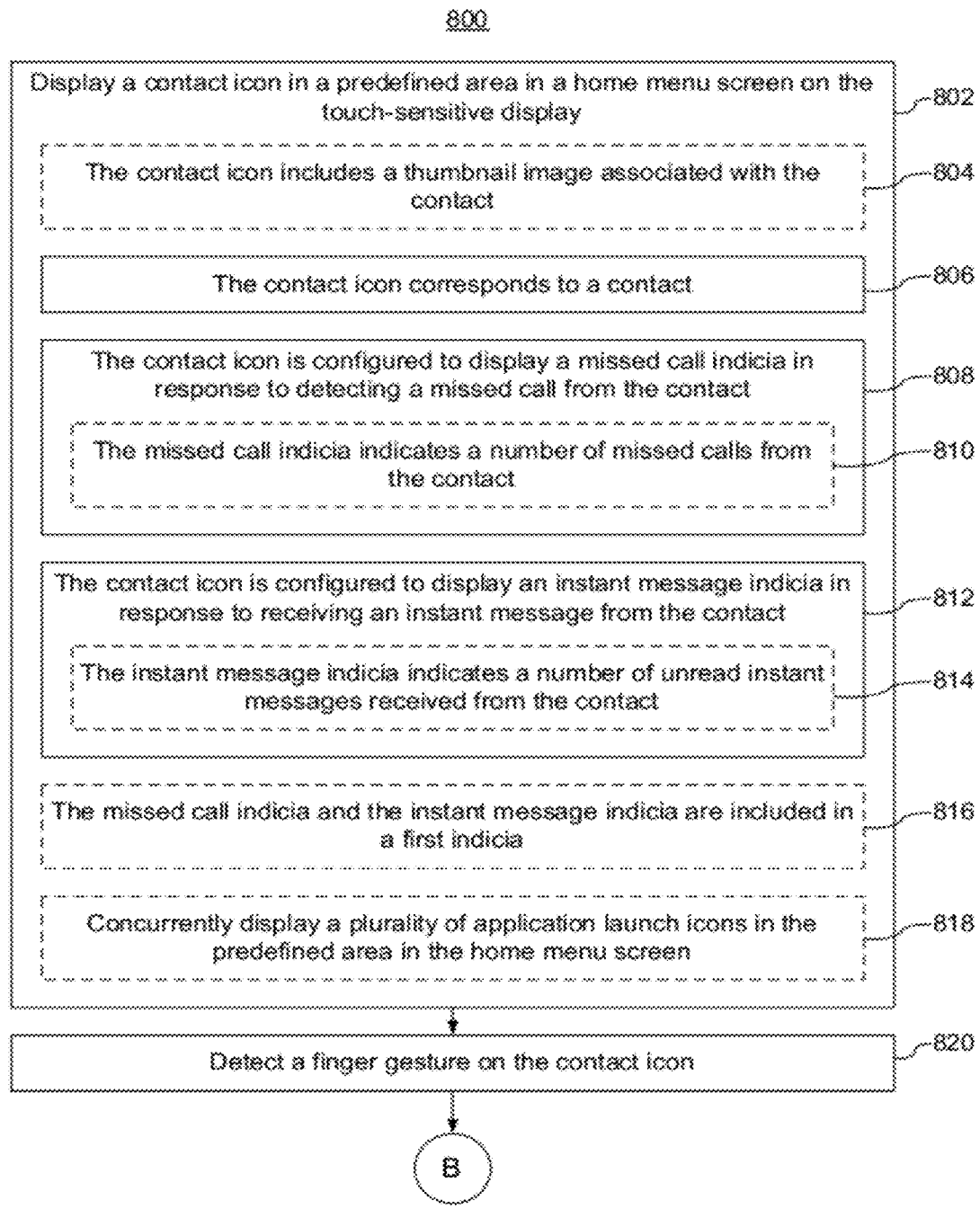
FIGS. 8A-8B are flow diagrams illustrating a method of displaying a contact icon and responding to activation of the contact icon in accordance with some embodiments.
Figure 8B:
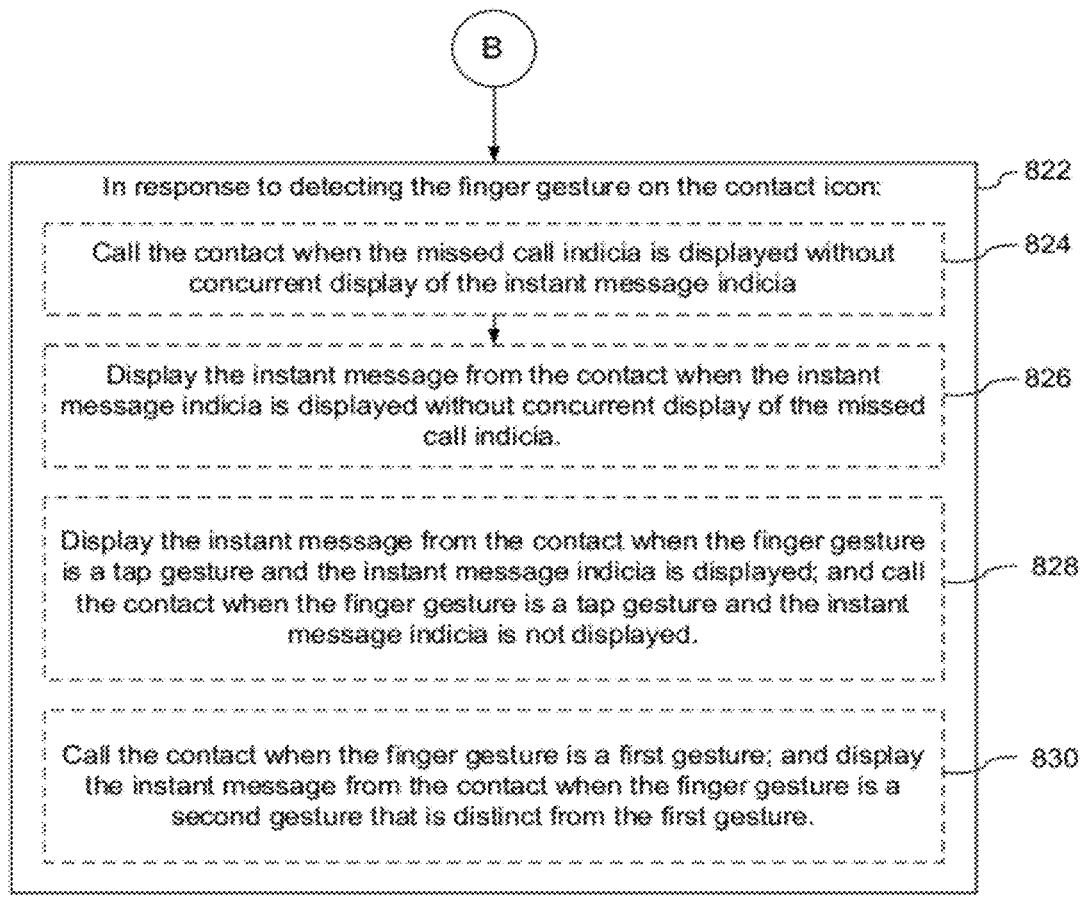

FIG. 7A depicts an exemplary user interface displaying a plurality of icons (e.g., application icons, such as photos 5002-1, clock 5002-2, browser 5002-3, solitaire 5002-4) on a home menu screen. The plurality of icons also includes one or more contact icons (e.g., 5008-1 through 5008-8). In some embodiments, the contact icons are chosen by the user and positioned on the home menu screen by the user. For example, a user may want to place a contact icon for a child, spouse, or co-worker on the home menu screen to use as a shortcut for communicating with that person by several methods (e.g., phone and instant message). In some embodiments, the one or more contact icons are arranged based on an order in which corresponding contacts are listed in an address book (e.g., contacts module 137). In some embodiments, the one or more contact icons are arranged based on a number of missed calls and messages (e.g., a contact with the most missed calls and messages is displayed first or on top-left corner). In some embodiments, the one or more contact icons are arranged based on a number of missed calls, regardless of a number of messages. In some embodiments, the one or more contact icons are arranged based on a number of messages, regardless of a number of missed calls. In some embodiments, the one or more contact icons are arranged based on a recency of a call or message (e.g., a contact who made an missed call or sent a message last is displayed first or on top-left corner). In some embodiments, the one or more contact icons are arranged based on a recency of a call made by or a message sent by a user (e.g., a contact whom a user called or emailed last is displayed first or on top-left corner). In some embodiments, the one or more contact icons are arranged based on importance (e.g., a contact who has been selected by a user as important is displayed before a contact who has not been selected by a user as important; or a contact who has communicated the most with a user is displayed first or on top-left corner). In some embodiments, the one or more contact icons are arranged based on importance of a respective message sent from the contact. For example, a contact icon for a contact who sends a message or leaves a voicemail that includes a predefined keyword, such as "rush," "urgent," "important," and "asap," is positioned before a contact icon for a contact who does not send such a message or leave such a voicemail. In some embodiments, any combination of above described criteria can be used for displaying and/or arranging contact icons on a home menu screen.

A respective contact icon is configured to display a missed call indicia in response to detecting a missed call from the contact (e.g., contact icon 5008-1 displays missed call indicia 5012-1 in the upper left corner of the contact icon, indicating that there is one missed call from contact 1). A respective contact icon is also configured to display an instant message indicia in response to detecting an instant message from the contact (e.g., contact icon 5008-3 displays instant message indicia 5014-3 in the upper right corner of the contact icon, indicating that there are four unread instant messages from contact 3). In some embodiments, a respective contact icon is configured to display an email message indicia in response to detecting an incoming email message from the contact (e.g., contact icon 5008-5 displays email message indicia 5016-5 in the lower left corner of the contact icon, indicating that there is one unread email message from contact 5). In some embodiments, a respective contact icon is configured to display an event indicia in response to detecting an upcoming event involving the contact (e.g., contact icon 5008-8 displays event indicia 5022-8 in the lower right corner of the contact icon, indicating that there is one upcoming event involving contact 8).

In some embodiments, for a respective contact icon, a missed call indicia, an instant message indicia, an email message indicia, and an event indicia are displayed at distinct locations (e.g., for contact icon 5008-8, missed call indicia 5012-8 is displayed on the upper-left corner, instant message indicia 5014-8 is displayed on the upper-right corner, email message indicia 5016-8 is displayed on the lower-left corner, and event indicia 5018-8 is displayed on the lower-right corner of contact icon 5008-8). In some embodiments, for a respective contact icon, a missed call indicia, an instant message indicia, an email message indicia, and an event indicia are displayed with distinct colors. In some embodiments, for a respective contact icon, a missed call indicia, an instant message indicia, an email message indicia, and an event indicia are displayed with distinct shapes (e.g., squares, circles, triangles, stars, etc.) or icons (e.g., a telephone icon for missed call indicia 5012, a letter icon for email message indicia 5016, etc.). In some embodiments, a user can customize one or more of: location, color, size, shape, and icon of a respective indicia.

In some embodiments, for at least one respective contact icon, two or more of a missed call indicia, an instant message indicia, an email message indicia, and an event indicia are included in a single indicia. For example, indicia 5018 includes a missed call indicia and an instant message indicia, indicating that there are two missed calls and three unread instant messages from contact 4. Alternatively, indicia 5018 may have a single indicia with the number "5," indicating that there are a total of five missed communications with the contact, without specifying the number of missed calls and the number of unread instant messages. Alternatively, indicia 5018 may have a single indicia such as an exclamation point "!" indicating that there are missed communications with the contact, without specifying the number of missed calls and the number of unread instant messages.

In some embodiments, a respective contact icon indicates missed calls, unread instant messages, unread email messages, and/or upcoming events without displaying one or more additional indicia (e.g., 5012, 5014, 5016, and 5022). Instead, missed calls, unread instant messages, unread email messages, and/or upcoming events may be indicated by altering the appearance of the respective contact icon. For example, a respective contact icon may be displayed at a larger size based on the number of missed calls, and return to its normal size when a user checks the missed calls. A respective contact icon may be displayed at progressively larger sizes based on the number of missed calls and/or other unseen communications, and return to its normal size when a user checks the missed calls and/or other unseen communications. In addition, or alternatively, the respective contact icon may display a different icon, change its color, or display a distinct animation based on a number of one or more of: missed calls, unread instant messages, unread email messages, and upcoming events.

When a finger gesture (e.g., a tap gesture) is detected on a contact icon (e.g., 5008-1 through 5008-8), the device calls a number associated with the corresponding contact (e.g., FIG. 7B), or displays instant messages from the corresponding person (e.g., FIG. 7C), depending on predefined conditions. Alternatively, the device may conditionally display one or more email messages from the corresponding person (e.g., FIG. 7D).

FIGS. 8A-8B are flow diagrams illustrating a method 800 of displaying a contact icon and responding to activation of the contact icon in accordance with some embodiments. Method 800 is performed at a portable electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, method 800 provides an intuitive way to indicate missed or unread communications from a specific person (contact) and to respond efficiently to such communications. When a contact icon for the specific person is activated, the method selects and activates a communication mode to respond to the specific person based on the missed or unread communications from the specific person, without requiring additional input from the user to select and activate the communication mode. The method reduces the cognitive burden on a user when seeing and responding to missed or unread communications from a specific person, thereby creating a more efficient human-machine interface. For battery-operated computing devices, enabling a user to see and respond to missed or unread communications from a specific person faster and more efficiently conserves power and increases the time between battery charges.

The device displays (802) a contact icon in a predefined area in a home menu screen on the touch-sensitive display (e.g., any one of contact icons 5008-1 through 5008-8 in a home menu screen in FIG. 7A).

In some embodiments, the device displays a plurality of contact icons at predefined locations in the home menu screen on the touch-sensitive display.

In some embodiments, the contact icon includes (804) a thumbnail image associated with the contact (e.g., each contact icon 5008 in FIG. 7A can be a thumbnail image of a photo assigned to the contact). In some embodiments, the contact icon (e.g., 5008) includes a photo of the contact (or contact person).

The contact icon corresponds (806) to a contact (e.g., a respective contact icon corresponds to a distinct contact). In some embodiments, the contact (and/or contact information, such as a phone number, email address, etc.) is stored in an electronic address book for a user, such as contacts module 137. In some embodiments, a respective contact icon is distinct from other displayed contact icons.

The contact icon is configured (808) to display a missed call indicia in response to detecting a missed call from the contact (e.g., missed call indicia 5012-1 in FIG. 7A). In some embodiments, the missed call indicia indicates (810) a number of missed calls from the contact (e.g., in FIG. 7A, contact 1 made a call to a user of device 100 once, which was not answered).

The contact icon is configured (812) to display an instant message indicia in response to receiving an instant message from the contact (e.g., instant message indicia 5014-3 in FIG. 7A). In some embodiments, the instant message indicia indicates (814) a number of unread instant messages received from the contact (e.g., a number of instant messages from the contact that were not viewed by a user; or a number of instant messages from the contact that were not selected by the user as read; or a number of instant messages from the contact that were received since the user last read instant messages from the contact).

In some embodiments, the missed call indicia and the instant message indicia are included (816) in a first indicia (e.g., in FIG. 7A, indicia 5018 includes missed call indicia and instant message indicia).

In some embodiments, the device concurrently displays (818) a plurality of application launch icons in the predefined area in the home menu screen (e.g., icons 5002-1 through 5002-4 and 5002-14 through 5002-16 in FIG. 7A). In response to detecting activation of an application launch icon, an application that corresponds to the activated application icon is launched and displayed. The application launch icons are not for issuing commands or subcommands with an application. Rather, they are for launching applications. If an application is already launched, then activation of the corresponding application launch icon results in display of the application.

The device detects (820) a finger gesture on the contact icon (e.g., a finger tap gesture on one of contact icons 5008-1 through 5008-8 in FIG. 7A).

Figure 7B:
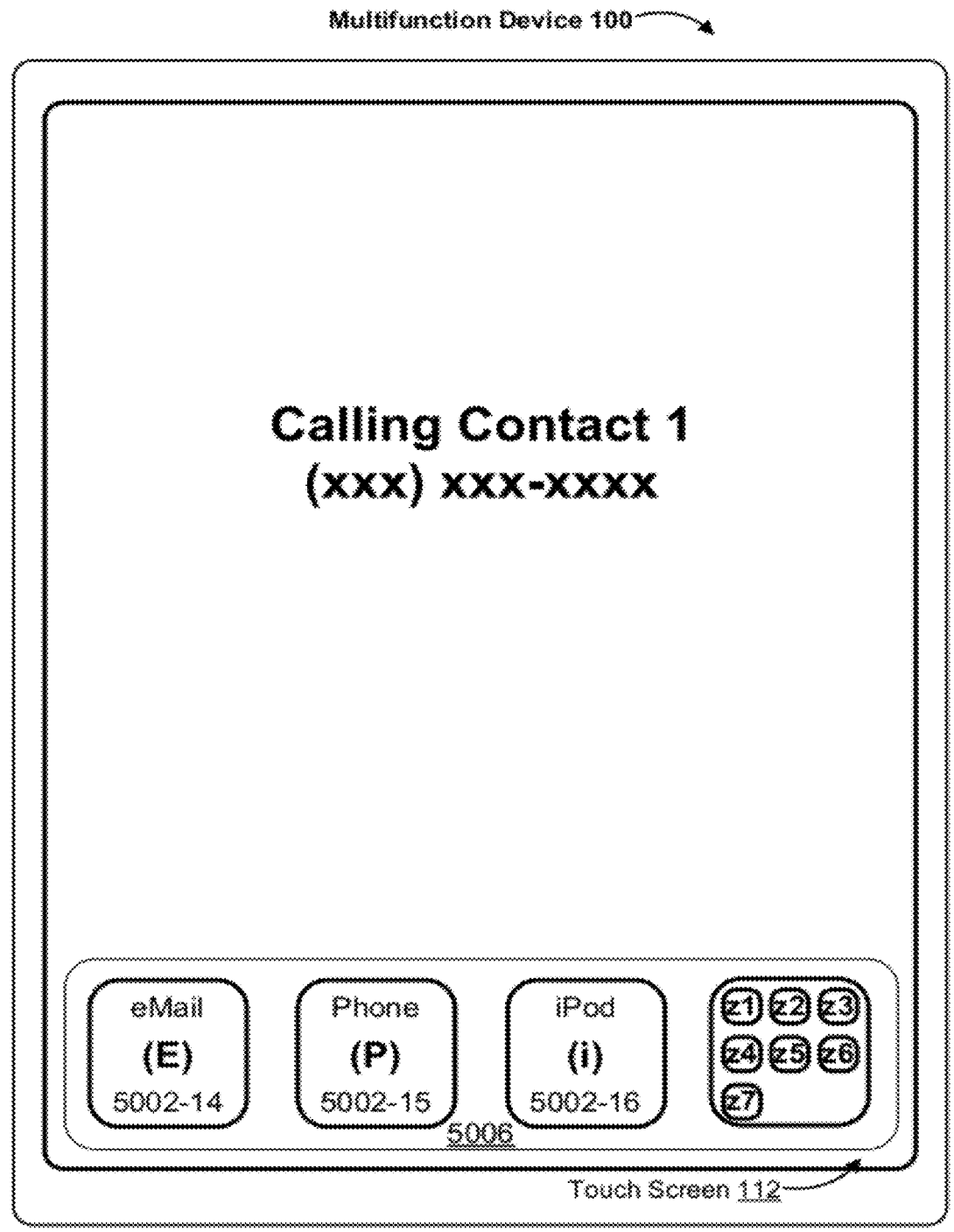

In response to detecting the finger gesture on the contact icon (822), the device calls (824) the contact (e.g., using telephone module 138, as shown in FIG. 7B) when the missed call indicia is displayed without concurrent display of the instant message indicia (e.g., contact 5008-1 in FIG. 7A). In some embodiments, calling the contact includes calling a phone number associated with the contact (e.g., using telephone module 138). In some embodiments, calling the contact includes identifying a phone number associated with the contact (e.g., using contacts module 137).

Figure 7C:
Figure 7D:
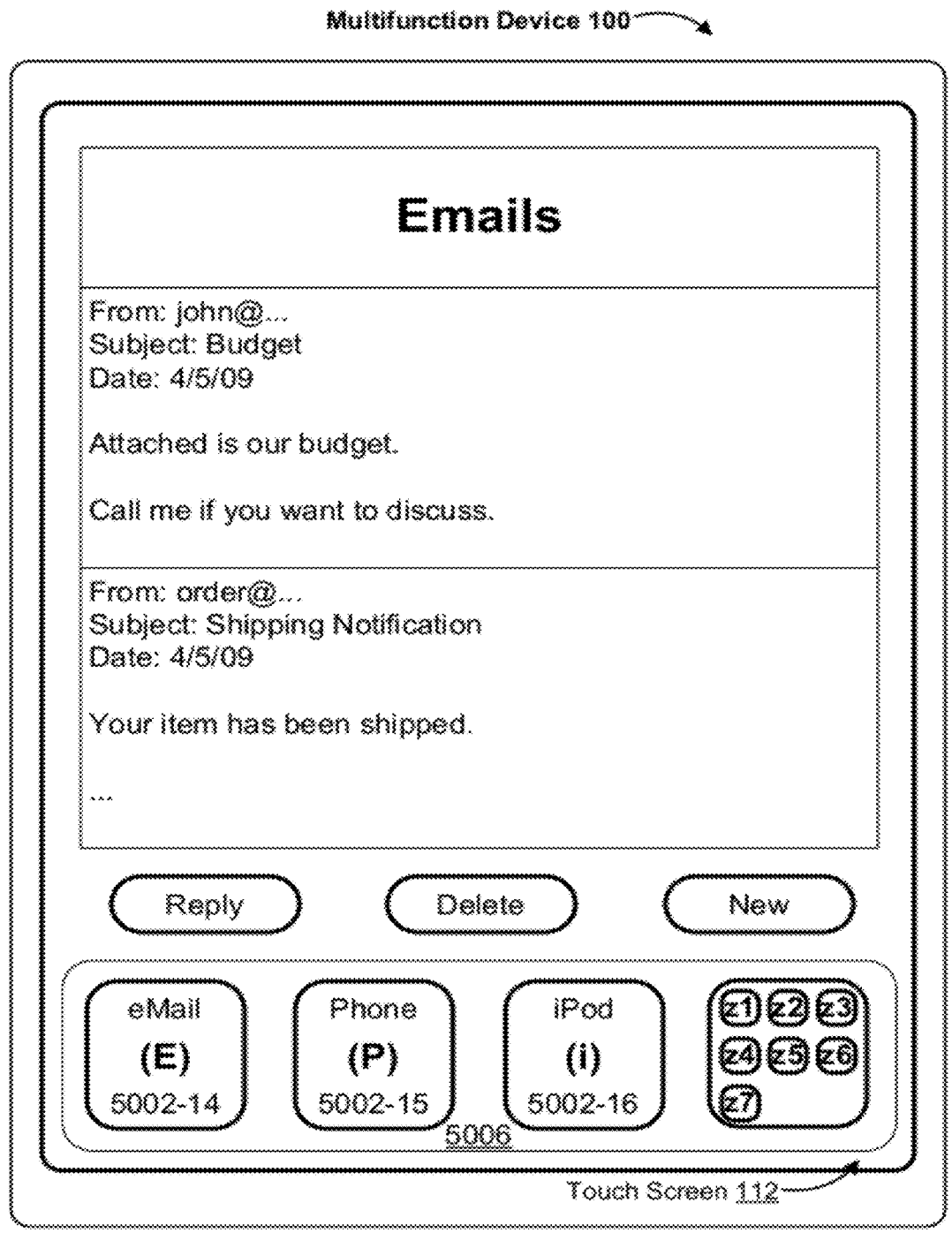

In response to detecting the finger gesture on the contact icon (822), the device displays (826) the instant message from the contact (e.g., using instant messaging module 141 as shown in FIG. 7C) when the instant message indicia is displayed without concurrent display of the missed call indicia (e.g., contact 5008-3 in FIG. 7A). In some embodiments, displaying the instant message from the contact includes retrieving the instant message from the contact (e.g., using instant messaging module 141). In some embodiments, the instant message is displayed in an instant messaging application (e.g., instant messaging module 141) in an interface that may also be used to draft and send an instant message to the contact.

In operations 822-826, the same gesture (e.g., a simple tap gesture) leads to activation of a different communication mode to respond to the specific person depending on the missed or unread communications from the specific person. The device determines how to respond to the gesture based on, e.g., the number and type of missed or unread communications from the specific person, without requiring the user to remember different gestures to invoke different communication modes.

In some embodiments, in response to detecting the finger gesture on the contact icon, the device displays (828) the instant message from the contact when the finger gesture is a tap gesture and the instant message indicia is displayed (e.g., using instant messaging module 141); and calls the contact when the finger gesture is a tap gesture and the instant message indicia is not displayed. In these embodiments, the same gesture (e.g., a simple tap gesture) leads to activation of a different communication mode to respond to the specific person depending on the missed or unread communications from the specific person.

In some embodiments, in response to detecting the finger gesture (e.g., a tap gesture) on the contact icon, the device calls the contact when a first number is more than a second number; and displays the instant message from the contact when the second number is more than the first number. The first number is a number of times a user of the device 100 called the contact, and the second number is a number of times the user sent messages to the contact. In these embodiments, the same gesture (e.g., a simple tap gesture) leads to activation of a different communication mode to respond to the specific person depending on the missed or unread communications from the specific person.

In some embodiments, in response to detecting the finger gesture on the contact icon, the device calls (830) the contact when the finger gesture is a first gesture (e.g., a left-slide gesture); and displays the instant message from the contact when the finger gesture is a second gesture that is distinct from the first gesture (e.g., a right-slide gesture). In some embodiments, the first gesture is an upper-left slide gesture, and the second gesture is an upper-right slide gesture. In these embodiments, different gestures lead to activation of different communication modes, which requires the user to remember the different gestures.

In some embodiments, when the contact icon includes a facial image or photo of the contact, the device calls the contact when the finger gesture (e.g., a tap gesture) is detected at a location that corresponds to an ear or mouth in the facial image or photo; and displays the instant message (or an email message) from the contact when the finger gesture is detected at a location that corresponds to one or more eyes in the facial image or photo.

In some embodiments, the respective contact icon is configured to display an email message indicia in response to detecting an incoming email message from the contact (e.g., email message indicia 5016-5 in FIG. 7A). In some embodiments, in response to detecting the finger gesture on the contact icon, the device displays email messages from the contact (e.g., using e-mail client module 140) when the finger gesture is a third gesture (e.g., a lower-left slide gesture).

In some embodiments, the respective contact icon is configured to display an event indicia in response to detecting an upcoming event involving the contact (e.g., event indicia 5022-8 in FIG. 7A). In some embodiments, in response to detecting the finger gesture on the contact icon, the device displays upcoming calendar events (e.g., events that involve both a user of the device 100 and the contact, and will occur within a predefined time) associated with the contact (e.g., using calendar module 148) when the finger gesture is a fourth gesture (e.g., a lower-right slide gesture).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6B and 8A-8B may be implemented by components depicted in FIGS. 1A-1C. For example, detection operation 616, and activating operation 624 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
  at a portable electronic device with a touch-sensitive display:
    displaying a plurality of icons on the touch-sensitive display, the plurality of icons including a closed folder icon that corresponds to a folder that contains a plurality of items, the closed folder icon including respective selectable application launch icon indicators for at least some of the application launch icons in the folder;
    detecting a finger gesture on the touch-sensitive display at a location that corresponds to the closed folder icon; and,
    in response to detecting the finger gesture on the touch-sensitive display at the location that corresponds to the closed folder icon:

determining a respective application launch icon in the plurality of application launch icons in the folder that corresponds to the detected finger gesture, wherein determining the respective application launch icon in the plurality of application launch icons in the folder that corresponds to the detected finger gesture includes:
   detecting a direction of movement of the finger gesture at the location that corresponds to the folder icon, and
   selecting the respective application launch icon that corresponds to the direction of movement of the finger gesture; and
   activating the respective application launch icon without opening the folder that contains the plurality of application launch icons.

2. The method of claim 1, wherein the respective selectable application launch icon indicators are displayed in the folder icon in accordance with an arrangement of the corresponding application launch icons within the folder.

3. The method of claim 1, wherein the respective selectable application launch icon indicators are displayed in the folder icon in accordance with a frequency of use of the application launch icons in the folder.

4. The method of claim 1, wherein the respective selectable application launch icon indicators are displayed in the folder icon in accordance with a recency of use of the application launch icons in the folder.

5. The method of claim 1, wherein the respective selectable application launch icon indicators are displayed in the folder icon in accordance with a frequency and recency of use of the application launch icons in the folder.

6. The method of claim 1, wherein the folder icon includes respective selectable item-application launch icon indicators for up to nine application launch icons in the folder.

7. The method of claim 1, wherein the folder icon includes respective selectable application launch icon indicators for up to four application launch icons in the folder.

8. An electronic device, comprising:
   a touch-sensitive display;
   one or more processors;
   memory; and
   one or more programs, wherein the one or more programs are stored in the memory and configured to be executed by the one or more processors, the one or more programs including instructions for:
   displaying a plurality of icons on the touch-sensitive display, the plurality of icons including a closed folder icon that corresponds to a folder that contains a plurality of application launch icons, the closed folder icon including respective selectable application launch icon indicators for at least some of the application launch icons in the folder;
   detecting a finger gesture on the touch-sensitive display at a location that corresponds to the closed folder icon; and,
   in response to detecting the finger gesture on the touch-sensitive display at the location that corresponds to the closed folder icon:
      determining a respective application launch icon in the plurality of application launch icons in the folder that corresponds to the detected finger gesture, wherein determining the respective application launch icon in the plurality of application launch icons in the folder that corresponds to the detected finger gesture includes:
         detecting a direction of movement of the finger gesture at the location that corresponds to the folder icon, and
         selecting the respective application launch icon that corresponds to the direction of movement of the finger gesture; and
      activating the respective application launch icon without opening the folder that contains the plurality of application launch icons.

9. The device of claim 8, wherein the respective selectable application launch icon indicators are displayed in the folder icon in accordance with an arrangement of the corresponding application launch icons within the folder.

10. The device of claim 8, wherein the respective selectable application launch icon indicators are displayed in the folder icon in accordance with a frequency of use of the application launch icons in the folder.

11. The device of claim 8, wherein the respective selectable application launch icon indicators are displayed in the folder icon in accordance with a recency of use of the application launch icons in the folder.

12. The device of claim 8, wherein the respective selectable application launch icon indicators are displayed in the folder icon in accordance with a frequency and recency of use of the application launch icons in the folder.

13. The device of claim 8, wherein the folder icon includes respective selectable application launch icon indicators of up to nine application launch icons in the folder.

14. The device of claim 8, wherein the folder icon includes respective selectable application launch icon indicators of up to four application launch icons in the folder.

15. A non-transitory computer readable storage medium storing one or more programs, the one or more programs comprising instructions, which when executed by an electronic device with a touch-sensitive display, cause the device to:
   display a plurality of icons on the touch-sensitive display, the plurality of icons including a closed folder icon that corresponds to a folder that contains a plurality of application launch icons, the closed folder icon including respective selectable application launch icon indicators for at least some of the application launch icons in the folder;
   detect a finger gesture on the touch-sensitive display at a location that corresponds to the closed folder icon; and,
   in response to detecting the finger gesture on the touch-sensitive display at the location that corresponds to the closed folder icon:
      determine a respective application launch icon in the plurality of application launch icons in the folder that corresponds to the detected finger gesture, wherein the instructions that cause the device to determine the respective application launch icon in the plurality of a application launch icons in the folder that corresponds to the detected finger gesture further includes instructions that cause the device to:
         detect a direction of movement of the finger gesture at the location that corresponds to the folder icon, and
         select the respective application launch icon that corresponds to the direction of movement of the finger gesture; and
      activate the respective application launch icon without opening the folder that contains the plurality of application launch icons.

16. The computer readable storage medium of claim 15, wherein the respective selectable application launch icon indicators are displayed in the folder icon in accordance with an arrangement of the corresponding application launch icons within the folder.

17. The computer readable storage medium of claim 15, wherein the respective selectable application launch icon indicators are displayed in the folder icon in accordance with a frequency of use of the application launch icons in the folder.

18. The computer readable storage medium of claim 15, wherein the respective selectable application launch icon indicators are displayed in the folder icon in accordance with a recency of use of the application launch icons in the folder.

19. The computer readable storage medium of claim 15, wherein the respective selectable application launch icon indicators are displayed in the folder icon in accordance with a frequency and recency of use of the application launch icons in the folder.

20. The computer readable storage medium of claim 15, wherein the folder icon includes respective selectable application launch icon indicators for up to nine application launch icons in the folder.

21. The computer readable storage medium of claim 15, wherein the folder icon includes respective selectable application launch icon indicators for up to four application launch icons in the folder.

* * * * *